(12) United States Patent
Seto

(10) Patent No.: US 6,449,230 B1
(45) Date of Patent: Sep. 10, 2002

(54) OPTICAL DISC DRIVE APPARATUS

(75) Inventor: Hidekazu Seto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/920,134

(22) Filed: Aug. 1, 2001

(30) Foreign Application Priority Data

Aug. 3, 2000 (JP) ........................................ 2000-235604
Jun. 21, 2001 (JP) ........................................ 2001-188659

(51) Int. Cl.[7] ............................................... G11B 20/10
(52) U.S. Cl. ................................ 369/53.19; 369/44.14
(58) Field of Search ........................... 369/53.19, 44.14, 369/44.13, 44.15

(56) References Cited

U.S. PATENT DOCUMENTS 6,282,161 B1 * 8/2001 Son et al. ................. 369/53.19

* cited by examiner

Primary Examiner—Nabil Hindi
(74) Attorney, Agent, or Firm—Jay H. Maioli

(57) ABSTRACT

An optical disc drive apparatus having a skew servo mechanism in which end portions of a pair of parallel running guide shaft members for guiding an optical pickup unit are slidably secured to a chassis on which a spindle motor having a turntable is mounted to be rotationally driven in a radial direction by a pair of pivot members, and other end portions of the pair of the guide shaft members are rotatably driven in the radial direction by first and second cam surfaces of a sliding cam which is driven in a direction orthogonally intersecting the pair of the guide shafts based on a result detected by a skew detecting element.

21 Claims, 21 Drawing Sheets

OPTICAL DISC DRIVE APPARATUS

BACKGROUND OF THE INVENTION

1. Field of the Invention

The present invention relates to an optical disc drive apparatus suitable for applying to such an optical disc drive apparatus used for recording and/or reproducing audio/video data onto and/or from an optical disc such as a laser disc (LD) or a digital versatile disc (DVD), for example. More particularly, the present invention relates to an optical disc drive apparatus equipped with a skew servo mechanism which enables optical axis of optical beams emitted from an optical pickup unit to vertically follow up skew of a signal surface caused by the skewed disc surface.

2. Related Art

In a conventional optical disc drive apparatus, an optical disc such as a CD (Compact Disc), an LD (Laser Disc) or a DVD (Digital Versatile Disc) is mounted on a turn table linked with a spindle motor and rotated to cause optical beams emitted from an optical pickup unit to be focused on a signal surface of the optical disc. The optical pickup unit is guided by a pair of run guide shafts and is seeking in the radial direction of the optical disc and in the direction parallel to the signal surface of the optical disc, thereby recording and or reproducing operation of the optical disc is performed.

Nevertheless, inasmuch as an optical disc comprises a thin disc made of synthetic resin, while an optical disc mounted on a turn table is rotated, therefore the skew is easily generated on the optical disc. In particular, substantial skew is easily generated along an external periphery of the optical disc. Once such skew is generated on the optical disc rotated by the turn table, it causes a skew of the signal surface of the optical disc against the optical axis of the optical beams emitted from the optical pickup unit, and thereby it no longer possible to permit the optical beams focused via object lenses to be irradiated and to be reflected perpendicularly to the signal surface of the optical disc, thus degrading performance of the optical disc to properly record and/or reproduce audio/video data onto and/or from the optical disc.

In particular, in case of a high-density optical disc such as a digital versatile disc (DVD) for example, the wave length of the optical beams is shortened, numerical apertures (NA) of the objective lens are improved due to a high signal recording density in recent years. Because of this, even the slightest skew generated on the signal surface of an optical disc against optical axis of the object lenses causes deterioration of performance of the optical disc upon recording and/or reproducing audio/video data, thus generating a problem.

To deal with this problem, any of the conventional optical disc drive apparatuses incorporates such a skew servo mechanism which initially enables a skew sensor to detect a skew of the signal surface against the optical axis of the object lenses caused by the skew generated on the optical disc and then causes an optical pickup unit to follow up the signal surface of the optical disc in order that optical axis of the object lenses can become perpendicular to the signal surface on the back side of the optical disc.

Concretely, as shown in FIG. 21, according to a construction of any conventional skew servo mechanism, in order to enable an optical pickup unit 1 mounted with object lenses 1a to properly run itself in the X direction (i.e., radial direction) along a signal surface of an optical disc (not shown), a pair of parallel running guide shaft members 2 are secured to a first chassis 3 which is included in an aperture portion 4a formed on a second chassis 4. The first chassis 3 is rotatably and adjustably installed in the Z direction (i.e., vertical direction) against the signal surface of the optical disc by means of a horizontal pivot axis 5 which is orthogonal to a pair of the guide shaft members 2, where the above Z direction corresponds to the direction perpendicular to the second chassis 4. A spindle motor (not shown) linked with a turn table (not shown) is mounted on the second chassis 4. The second cassis 4 causes an elevating mechanism (not shown) to vertically drive the optical pickup unit 1 and the spindle motor into and out from a main chassis inside of a main body of the optical disc drive apparatus via rotating movement by way of pivoting on the horizontal pivot axis 5. Thereby chucking and un-chucking of the optical disc against the turn table of the spindle motor is done and simultaneously the object lens 1a of the optical pickup unit 1 is made to come close to and to depart from the signal surface on the back side of the optical disc. While executing the above processes, a skew sensor mounted on the optical pickup unit 1 detects a radial-directional skew along X direction against the signal surface of the optical disc while being rotated in the state chucked with the turn table connected to the spindle motor. Then, by executing angular adjustment of the first chassis 3 against the second chassis 4 by way of pivoting on the horizontal pivot axis 5 via a first chassis rotational adjustment mechanism (not shown) driven by a motor in the XZ direction (i.e., the vertical direction synthesized with the X direction and Y direction, the skew servo mechanism executes the skew servo controlling operation to cause the optical axis to follow up the signal surface of the optical disc in order that the optical axis of the object lenses 1a can become perpendicular to the signal surface on the back side of the optical disc. On the other hand, inasmuch as the above-cited conventional skew servo mechanism mounts the optical pickup unit 1 on the first chassis 3, and yet, since it is required to introduce a double-chassis system for adjusting a positional angle of the first chassis 3 relative to the positional angle of the second chassis 4. Thereby the number of component parts has been increased to result in the complication of a structure to further result in the increased weight and vibration to raise another problem. Further, it has been quite difficult to realize a high-speed seeking operation due to a variable space between the first and second chassis 3 and 4 via elapse of time, and yet, an actual skew servo controlling operation has failed to exert proper performance to full extent. Further, inasmuch as the above-cited conventional skew servo mechanism is capable of adjusting the rotation of the first chassis 3 solely in the XZ direction against the second chassis 4 by way of pivoting on the pivot axis 5 which is orthogonal to a pair of the guide shafts 2. Even though the above skew servo mechanism is capable of controlling a radial skew to enable the optical axis to follow up the signal surface of the optical disc in order that the optical axis of the object lens 1a can become perpendicular to the vertical directional skew on the signal surface of the optical disc, the above skew servo mechanism still fails to properly control a tangential skew for controlling the skew of the object lens 1a against the signal surface on the back of the optical disc in the tangential direction being orthogonal to radial direction generated in the course of executing such a process for controlling the focus servo-mechanism of the object lens 1a.

SUMMARY OF THE INVENTION

The present invention has been achieved to fully solve the above problems by way of providing a novel optical disc drive apparatus which totally dispenses with introduction of the above-cited double-chassis system and makes it possible to execute bi-directional skew servo controlling operations in both the radial and tangential directions.

To achieve the above object, the optical disc drive apparatus realized by the present invention comprises: a pair of run guide shaft members disposed in parallel with each other, which jointly guide a skew servo mechanism by way of enabling an optical pickup unit to run itself in the radial direction along a signal surface of an optical disc, wherein the skew servo mechanism causes the optical pickup unit to follow up the signal surface in order that the optical axis of optical beams emitted from the optical pickup unit can become perpendicular to the signal surface of the optical disc; a pair of pivot members which are jointly secured to a chassis mounted with a spindle motor linked with a turn table, wherein said pivot members rotatably support an end of inner peripheral portions of an optical disc of the pair of run guide members in the direction perpendicular to the signal surface of the optical disc; a sliding cam which is slidably secured to a chassis and controls rotation of one end portions of a pair of run guide shaft members corresponding to an external peripheral side of the optical disc in the direction perpendicular to the signal surface of the optical disc by means of a pair of cam surfaces; a skew detecting means which detects a skew of the signal surface of the optical disc; and a slide cam driving means which controls a sliding movement of the above sliding cam based on the result detected by the above skew detecting means.

In the skew servo mechanism as described above, an actual skew generated on the signal surface of the optical disc is detected by the above skew detecting means to cause the above slide cam driving means to control the sliding movement of the above sliding cam. As a result, one end portions of a pair of run guide shaft members corresponding to the external peripheral side of the optical disc are driven by a pair of cam surfaces of the above slide cam to cause the pair of run guide shaft members to be rotatably controlled in the direction perpendicular to the signal surface of the optical disc by way of pivoting on a pair of pivot member supporting an end of the internal peripheral side of the optical disc. As a result, the skew servo controlling operation is executed by enabling the optical pickup unit to follow up the signal surface of the optical disc in order that optical axis of the optical beams emitted from the optical pickup unit running via guidance of the pair of run guide shaft members can become perpendicular to the signal surface of the optical disc. Inasmuch as the skew servo mechanism rotatably controls the pair of run guide shaft members for guiding the optical pickup unit, there is no need of introducing a double-chassis system, but the chassis mounted with a spindle motor is merely loaded with the inventive skew servo mechanism, whereby completing a single chassis construction.

DESCRIPTION OF THE PREFERRED EMBODIMENTS

Referring now to FIGS. 1 to 19, practical forms of an optical disc drive apparatus are explained by way of applying the present invention to such an optical disc drive apparatus comprising a DVD player or the like based on the sequence shown below.

Figure 1:
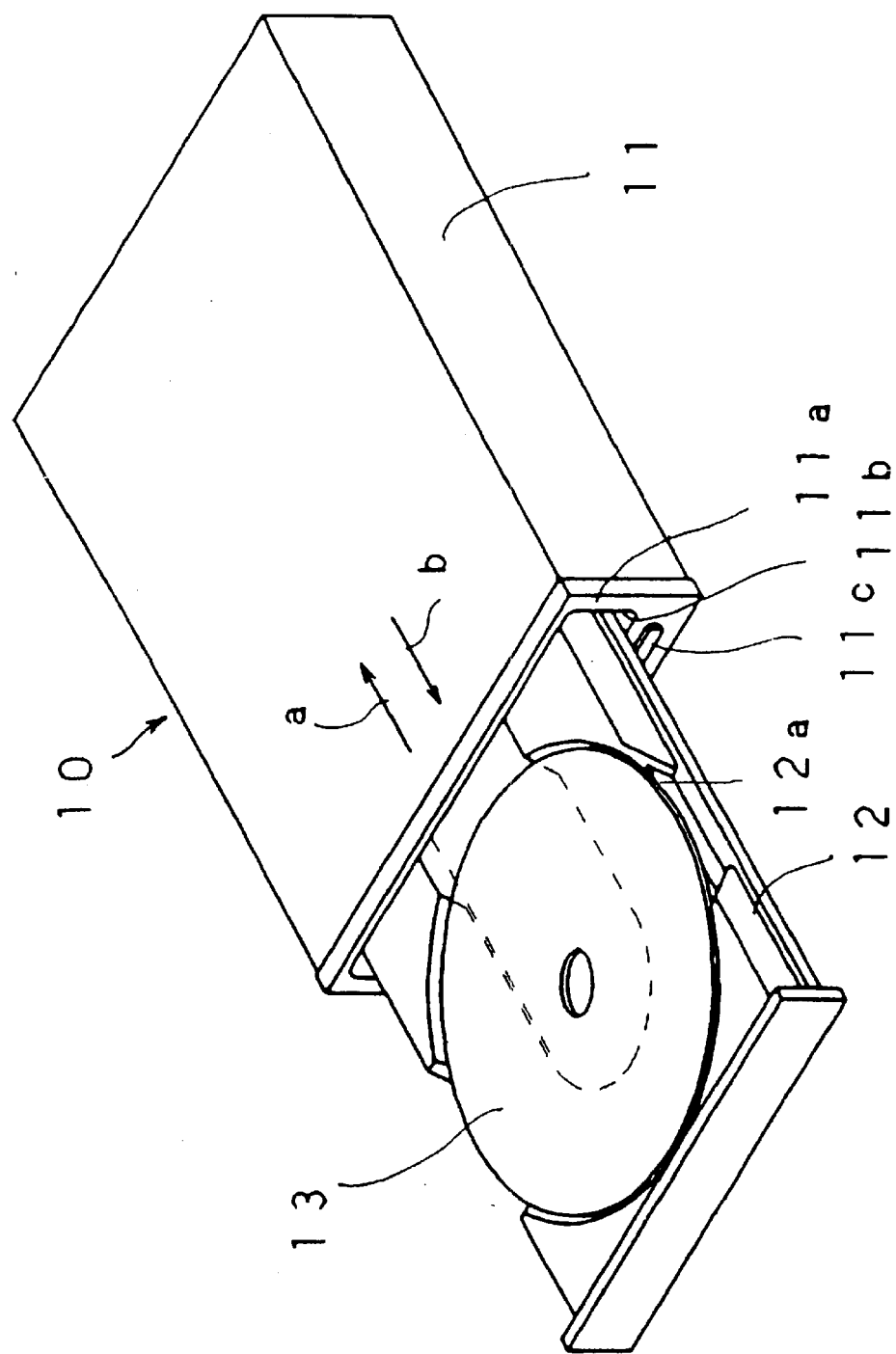
FIG. 1 presents a perspective view of external appearance of an optical disc drive apparatus applying the present invention.
Figure 2:
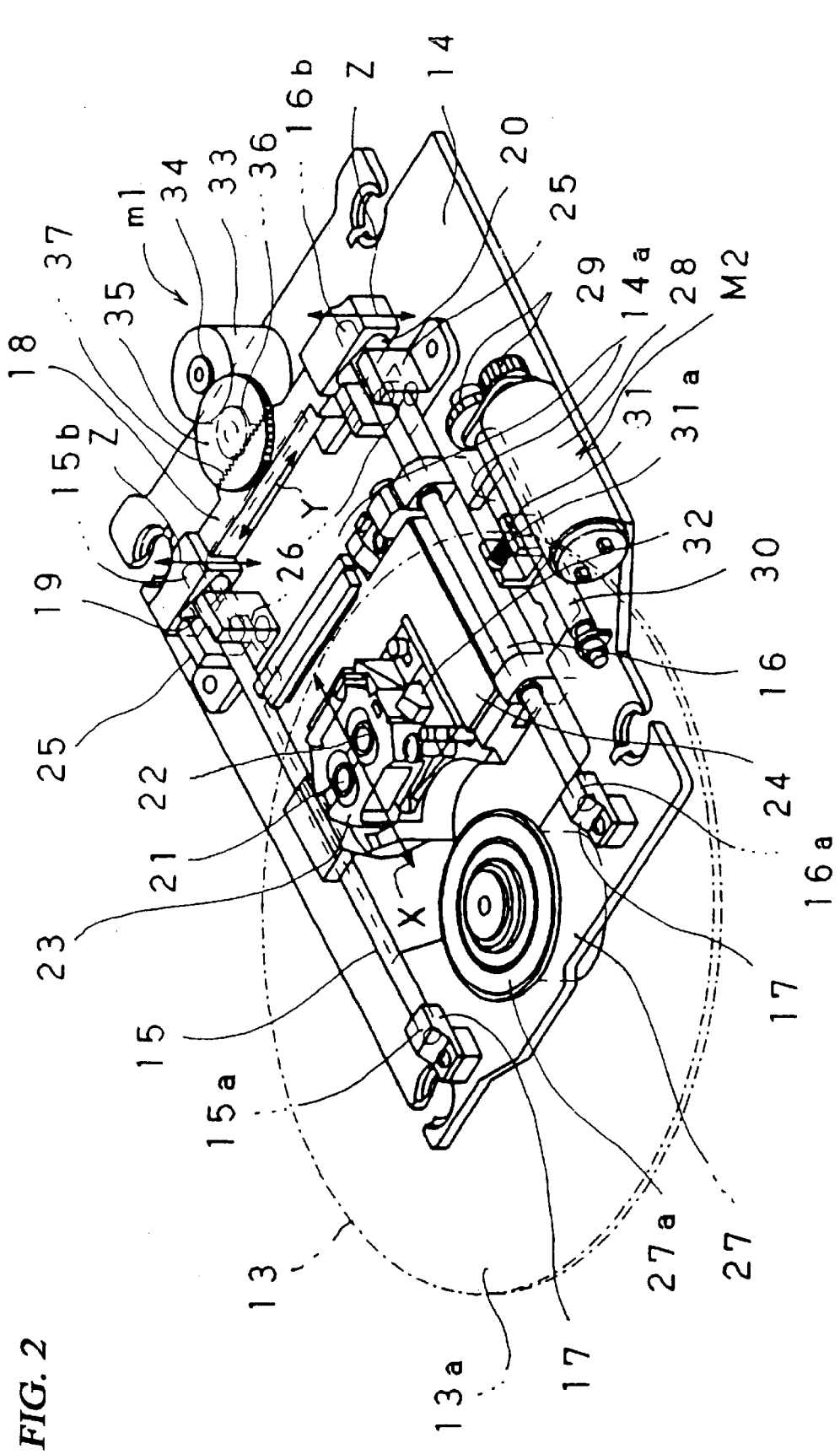
FIG. 2 presents a perspective view of skew servo mechanism for explanatory of the first practical form of the skew servo mechanism introduced to the optical disc drive apparatus related to the present invention.
Figure 3:
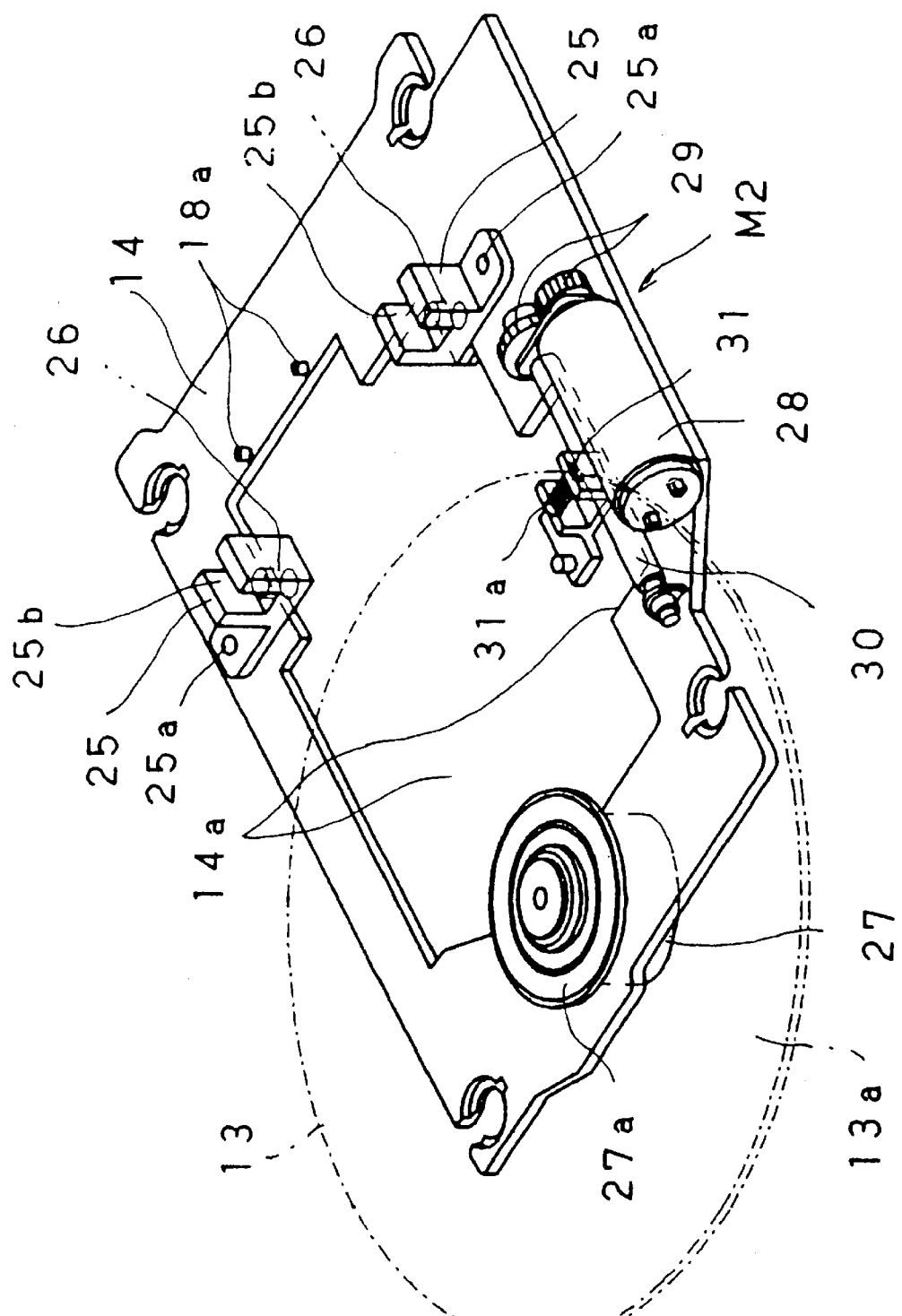
FIG. 3 presents a perspective view of a chassis for mounting the skew servo mechanism shown in FIG. 2 and a sled driving mechanism related to the present invention.
Figure 4:
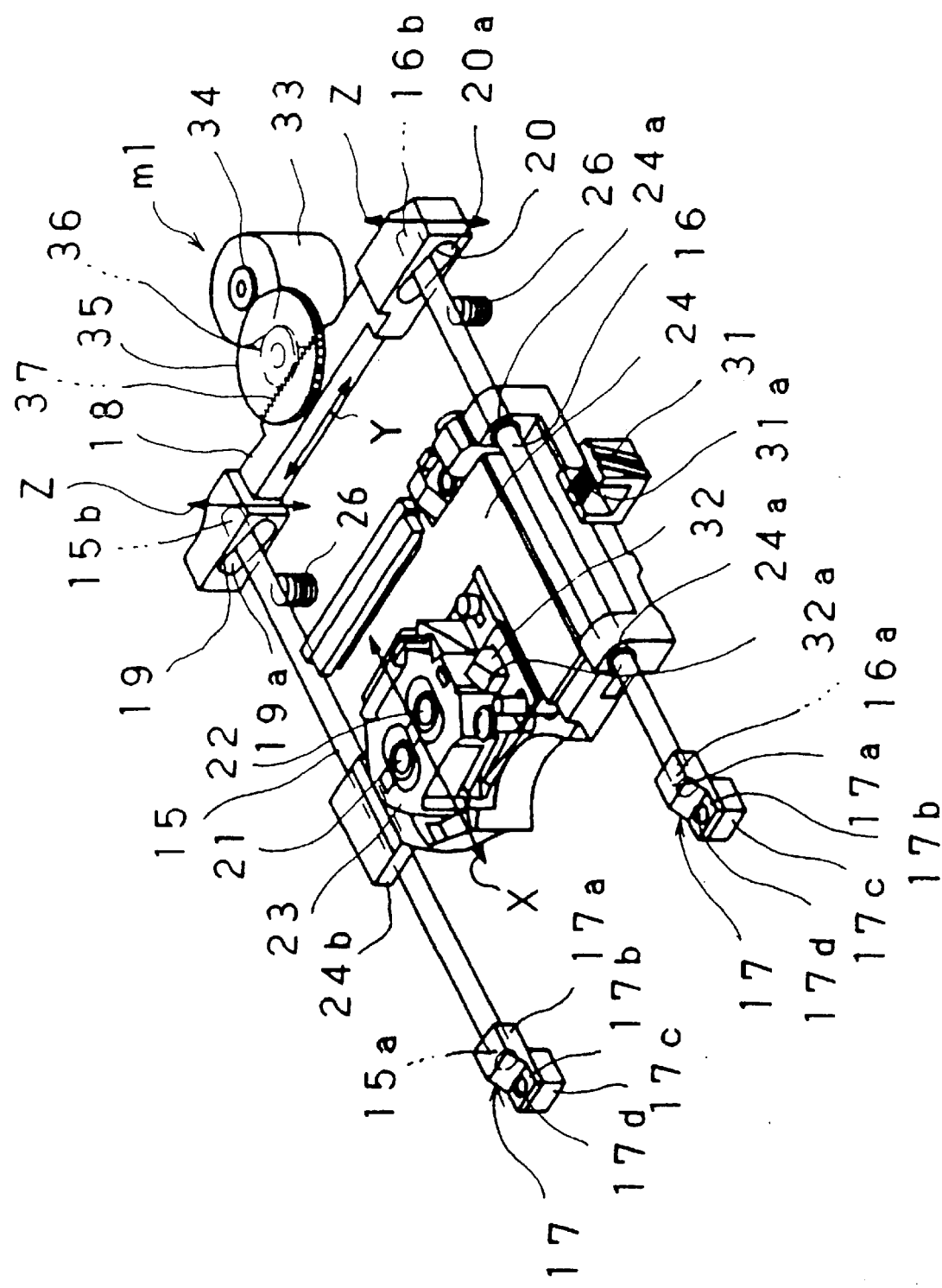
FIG. 4 presents a perspective view of the skew servo mechanism solely shown in FIG. 2.
Figure 5:
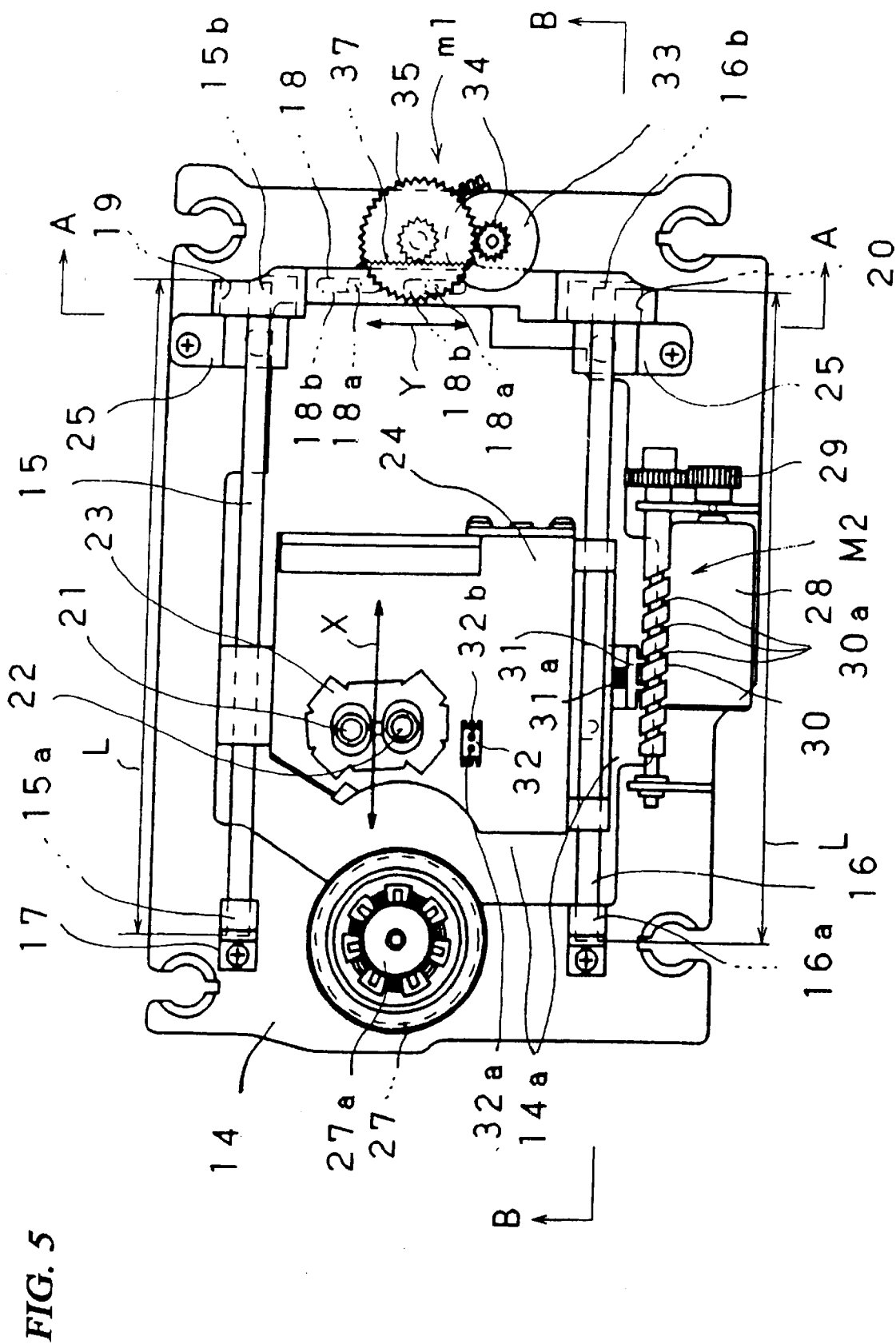
FIG. 5 presents a plan view of the skew servo mechanism shown in FIG. 2.
Figure 6:
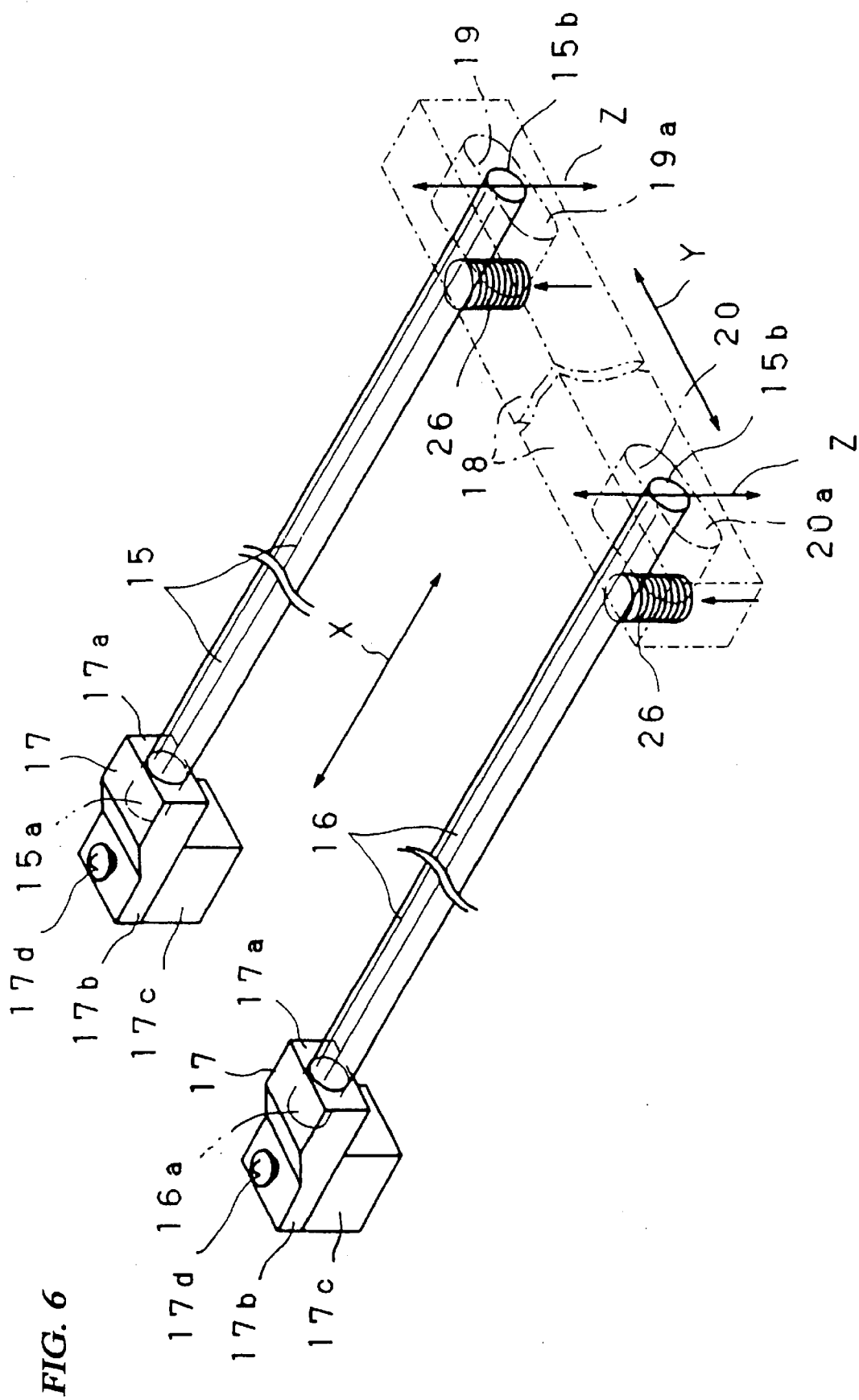
FIG. 6 presents a perspective view of a pivot portion at one end of a pair of guide shaft members shown in FIG. 2.

[1] Description on the whole components of an optical disc drive apparatus related to the present invention (refer to FIG. 1):

[2] Description on a first practical form of the skew servo mechanism related to the present invention (refer to FIG. 2 to FIG. 8):

[3] Description on a second practical form of the skew servo mechanism related to the present invention (refer to FIG. 9 and FIG. 10):

[4] Description on a third practical form of the skew servo mechanism related to the present invention (refer to FIG. 11):

[5] Description on the fourth practical form of the skew servo mechanism related to the present invention (refer to FIG. 12 and FIG. 13):

[6] Description on the fifth practical form of the skew servo mechanism related to the present invention (refer to FIG. 14 to FIG. 20):

[1] Description on the whole components of an optical disc drive apparatus related to the present invention:

Referring to FIG. 1, whole components of an optical disc drive apparatus 10, such as a DVD (Digital Versatile Disc) player for example, related to the present invention are described below. The optical disc drive apparatus 10 comprises a main body 11 which is formed with a flat and rectangular casing and a flat disc tray 12. It is so arranged that the disc tray 12 is horizontally loaded and unloaded into and out from the main body 11 of the optical disc drive apparatus 10 in the directions of arrows a and b by means of a disc tray loading mechanism (not shown) through a tray inserting/ejecting port 11b which is horizontally formed on a front panel 11a of the main body 11.

When operating the optical disc drive apparatus 10, the disc tray 12 is unloaded in the arrow b direction out of the optical disc drive apparatus 10. Then, an optical disc 13 such as a DVD, for example, is horizontally loaded inside of a substantially circular recessed portion 12a formed on an upper surface of the disc tray 12 for positioning the optical disc 13. Next, the disc tray 12 is loaded into the optical disc drive apparatus 12 in the arrow a direction. Simultaneously, the optical disc 13 is secured via chucking onto a turn table 27a linked with a spindle motor 27 installed inside of the main body 11 of the optical disc drive apparatus 10. Then, the optical disc 13 is rotated afloat above the recessed portion 12a of the disc tray 12 to enable an optical pickup unit to record and/or reproduce audio/video data onto and/or from a signal surface of the optical disc 13. After completing recording and/or reproducing audio/video data onto or from the optical disc 13, when an operator or user depresses an eject button 11c, then the optical disc 13 is disengaged (un-chucked) from the turn table 27a linked with the spindle motor 27 and then again placed inside of the recessed portion 12a of the disc tray 12, and after that the disc tray 12 is unloaded in the arrow b direction outside of the main body 11 of the optical disc drive apparatus 10.

[2] Description on the first practical form of the skew servo mechanism:

Referring now to FIGS. 2 to 8, the first practical form of the skew servo mechanism which is installed inside of the main body 11 of the optical disc drive apparatus 10 is described below.

The skew servo mechanism comprises a chassis 14 which is sometime called as a "base unit chassis". The whole mechanism such as an optical pickup unit 23, a spindle motor 27, a skew servo mechanism M1 and a sled driving mechanism M2 that are necessary for achieving the skew servo is mounted on the chassis 14.

When the chassis 14 is vertically driven via rotary movement at pivot portion against a second chassis in the main body 11 of the optical disc drive apparatus 10 via an elevating mechanism (not shown), the optical disc 13 is chucked with or un-chucked from the turn table 27a located above the spindle motor 27. At the same time, a pair of object lenses 21 and 22 of the optical pickup unit 23 jointly come close to and depart from the signal surface 13a on the back side of the optical disc 13. The above mentioned skew servo mechanism M1 controls the skew of the optical disc 13 shown in FIG. 8 generated in the XZ direction which is perpendicular to the signal surface 13a, where the XZ direction corresponds to the direction vertical to the chassis 14 of a pair of the guide shaft members 15 and 16 each having an equal length L and disposed in parallel with each other, where the guide shaft members 15 and 16 jointly guide a single or a pair of object lenses 21 and 22 and the sled 24 comprising a sliding base mounted with the skew detecting means 32 in the X direction being in parallel with the signal surface 13a on the back side of the optical disc 13 along radial direction of the optical disc 13.

By virtue of this arrangement, it is possible for the skew servo mechanism M1 to properly execute a radial-directional skew servo operation to enable an optical axis F of optical beams OB from the object lenses 21 and 22 to follow with the signal surface 13a of the optical disc 13 that is skewed in the radial direction in order that the optical axis F can become perpendicular to the signal surface 13a on the back side of the optical disc 13 all the time. The spindle motor 27 is vertically secured to the front end of the chassis 14 (left end portions in the FIGS. 2, 3 and 4). The turn table 27a integrally rotated with the rotor is horizontally disposed to the upper surface of the spindle motor 17. The optical disc 13 is horizontally chucked on the turn table 27a to be rotated by the spindle motor 27. A large square aperture 14a is formed through the center portion of the chassis 14 behind the spindle motor 27. A pair of the guide shaft members 15 and 16 aligned in parallel with the X direction and having an equal length are horizontally disposed along both sides of the above aperture 14a. End portions 15a and 16a of these guide shaft members 15 and 16 disposed on the inner peripheral sides against the optical disc 13 are rotatably held by a pair of pivot members 17 secured to the upper front portion of the chassis 14 so that the end portions 15a and 16a can jointly be rotated in the Z-direction against the chassis 14.

Each of the pivot members 17 comprises of a supporting member 17a made from elastic plastics, which are individually coupled with external periphery of the end portions 15a and 16a of the guide shaft members 15 and 16, where thinner portions 17a of these supporting members 17a are secured to the upper portions of the chassis 14 with screws 17d via bases 17c. By applying the elasticity of the thinner portions 17b of these supporting members 17a, the guide shaft members 15 and 16 are respectively supported in order that they can jointly be rotated in the Z-direction against the chassis 14.

Those portions close to the other end portions 15b and 16b disposed to the external peripheral sides of the above guide shaft members 15 and 16 against the optical disc 13 are respectively so held that they can jointly be lifted and lowered in the Z direction via guidance of a pair of the guide members 25 secured to the upper rear portions of the chassis 14.

The above guide members 25 are respectively made from plastics and secured to the upper portion of the chassis 14 with screws 25a. It is so arranged that those portions close to the other end portions 15b and 16b of the guide shaft members 15 and 16 can jointly be guided in the Z-direction inside of vertical guide slits 25b formed in these guide members 25. Because of this arrangement, these guide members 25 controls Y-directional movement of the above guide shaft members 15 and 16 being orthogonal to the X-direction The optical pickup unit 23 shown in FIGS. 2, 3, and 4 incorporates a pair of object lenses 21 and 22 and the skew detecting means 32 which are respectively compatibly used with a CD and a DVD for example. In addition, a sled 24 mounted with an optical pickup unit 23 is disposed across a pair of the guide shaft members 15 and 16 and placed inside of the above-referred aperture 14a of the chassis 14. It is so arranged that, by way of driving the sled 24 in the X-direction via guidance of a pair of the guide shaft members 15 and 16 inside of the aperture 14a, the optical pickup unit 23 is driven in the X direction corresponding to radial direction of the optical disc 13 to perform a seeking movement.

While the above operation is underway, a pair of thrust bearings 24a secured to one side portion of the sled 24 are inserted into external peripheral portion of the guide shaft member 16 as a main guide shaft member, whereas the other thrust guide bearing 24b secured to the other side of the sled 24 is loosely coupled with the guide shaft member 15 as a sub-guide shaft member, whereby causing the sled 24 to be driven in the X-direction based on the movement of the other guide shaft member 16. A sled driving mechanism M2 for driving the sled 24 in the X direction along a pair of the guide shaft members 15 and 16 horizontally mounts a skew motor 28 in parallel with the main guide shaft member 16 above one side portion (corresponding to a lateral portion of the main guide shaft member 16) of the aperture 14a of the chassis 14. The sled driving mechanism M2 comprises; a lead screw 30 which is horizontally and rotatably secured onto the chassis 14 inside of the skew motor 28 in parallel with the main guide shaft member 16 and rotatably driven by the skew motor 28 via a plurality of gears 29; and a substantially rack-formed coupling member 31 which is made from plastics being secured to one side portion of the sled 24 and yet coupled with a helical groove 30a of the lead screw 30. The coupling member 31 is elastically energized by a pre-pressure spring 31a functioning as a pre-pressuring means interposed between one side portion of the sled 24 inside of the helical groove 30a of the lead screw 30.

It is so arranged that, by rotationally driving the lead screw 30 in the normal and reverse directions by the skew motor 28 via a plurality of gears 29, the sled 24 is slidably driven in the X direction at a constant pitch by the helical groove 30a of the lead screw 30 via the coupling member 31. The above-referred skew servo mechanism M1 for adjusting Z-directional skew of the above-referred guide shaft members 15 and 16 against the chassis 14 is mounted on the upper rear portion of the chassis 14 corresponding to the other end portions 15b and 16b of the guide shaft members 15 and 16.

Concretely, the above skew servo mechanism M1 employs substantially a square post shaped sliding cam 18 made from plastics. The sliding cam 18 is disposed in the Y-direction corresponding to the tangential direction against the signal surface 13a of the optical disc 13 being orthogonal to the guide shaft members 15 and 16 at the upper rear portion of the chassis 14 by way of spanning itself between the other end portions 15b and 16b of the guide shaft members 15 and 16.

Further, the sliding cam 18 is slidably guided above the chassis 14 by a sliding guide mechanism in the Y direction corresponding to the length wise direction For example, the sliding guide mechanism comprises a pair of guide pins 18a which are vertically secured to the upper portion of the chassis 14 and individually disposed in the Y-direction at a certain interval; and a pair of guide slits 18b which are formed on the bottom surface of the sliding cam 18 in the Y direction at a certain interval in parallel with the Y direction and inserted into a pair of guide pins 18a. A pair of cam surfaces forming a first cam surface 19 and a second cam surface 20 are integrally formed on both end portions corresponding to the lengthwise direction of the sliding cam 18, where the first and second cam surfaces 19 and 20 are jointly gradient by the same angle θ along the Y direction. The first and second cam surfaces 19 and 20 are respectively formed on the upper surface of a first and second elongated holes 19a and 20a formed on both sides of the sliding cam 18.

The other end portions 15b and 16b of the guide shaft members 15 and 16 are elastically pressured upwards by a pair of pre-pressure springs 26 comprising a pair of compressed coil springs against the first and second cam surfaces 19 and 20 of the sliding cam 18. These pair of pre-pressuring springs 26 are vertically built in the center portion of the bottom of a pair of guide slits 25b of a pair of the guide members 25 for example.

A sliding cam driving means m1 is mounted on the center portion of the rear end of the chassis 14, where the sliding cam driving means m1 slidably drives the sliding cam 18 in the Y direction by way of guiding the sliding cam 18 with a pair of guide pins 18a and guide slits 18b. The sliding cam driving means m1 comprises a motor 33 vertically secured onto the chassis 14, an output gear 34 secured to the upper end of the motor shaft of the motor 33, an input gear (reduction gear) 35 which is rotatably secured to the upper end of a supporting shaft secured onto the chassis 14 and driven by the output gear 34, a pinion gear 36 which is concentrically and integrally formed below the input gear 35, and a rack 37 which is integrally formed on the back surface of the sliding cam 18 and driven by the pinion gear 36. The skew detecting means 32 is mounted upwardly on the sled 24 of the optical pickup unit 23. The skew detecting means 32 comprises of an optical-reflective type sensor including a light emitting element 32a and a light-receiving element 32b which are disposed along the running direction of the optical pickup unit 23, i e., in the X direction (the radial direction).

The light emitting element 32a emits detecting beams onto the signal surface 13a of the optical disc 13 which is rotated by the spindle motor 27 in the state horizontally being chucked on the turn table 27a. The optical beams reflected from the signal surface 13a are detected by the light-receiving element 32b. It is so arranged that, if the signal surface 13a of the optical disc 13 is skewed in the radial direction, amount of the optical beams received by the light-receiving element 32a varies whereby enabling the light emitting element 32a to detect that the signal surface 13a of the optical disc 13 is skewed in the radial direction.

In the optical disc drive apparatus 10, the optical disc 13 horizontally chucked on the turn table 27a is rotated by the spindle motor 27. While the optical beams are vertically focused onto the signal surface 13a on the back surface of the optical disc 13 by either of object lenses 21 and 22 of the optical pickup unit 23, the lead screw 30 the sled driving mechanism M2 via the plurality of gears 29, whereby causing the sled 24 to be slidably driven in the X direction at a constant pitch via guidance of a pair of the guide shaft members 16 and 16. Accordingly the optical pickup unit 23 is able to perform seeking operation in the X direction and to record and/or reproduce the audio/video data onto and/or from the signal surface 13a of the optical disc 13.

Next, the radial-directional skew servo operation according to the first practical form of the skew servo mechanism M1 is described below.

Concretely, whenever the signal surface 13a of the optical disc 13 rotated by the spindle motor 27 is skewed in the radial direction, the skew detecting means 32 detects radial-directional skew generated on the signal surface 13a. Then, in response to the result detected by the skew detecting means 32, the skew motor 33 of the sliding cam driving means m1 is rotated to cause the sliding cam 18 to be slidably driven in the Y-direction via the rack 37 by the pinion gear 36 which is driven with decelerated rotation via the output gear 34 and the reduction gear 35.

Figure 7:
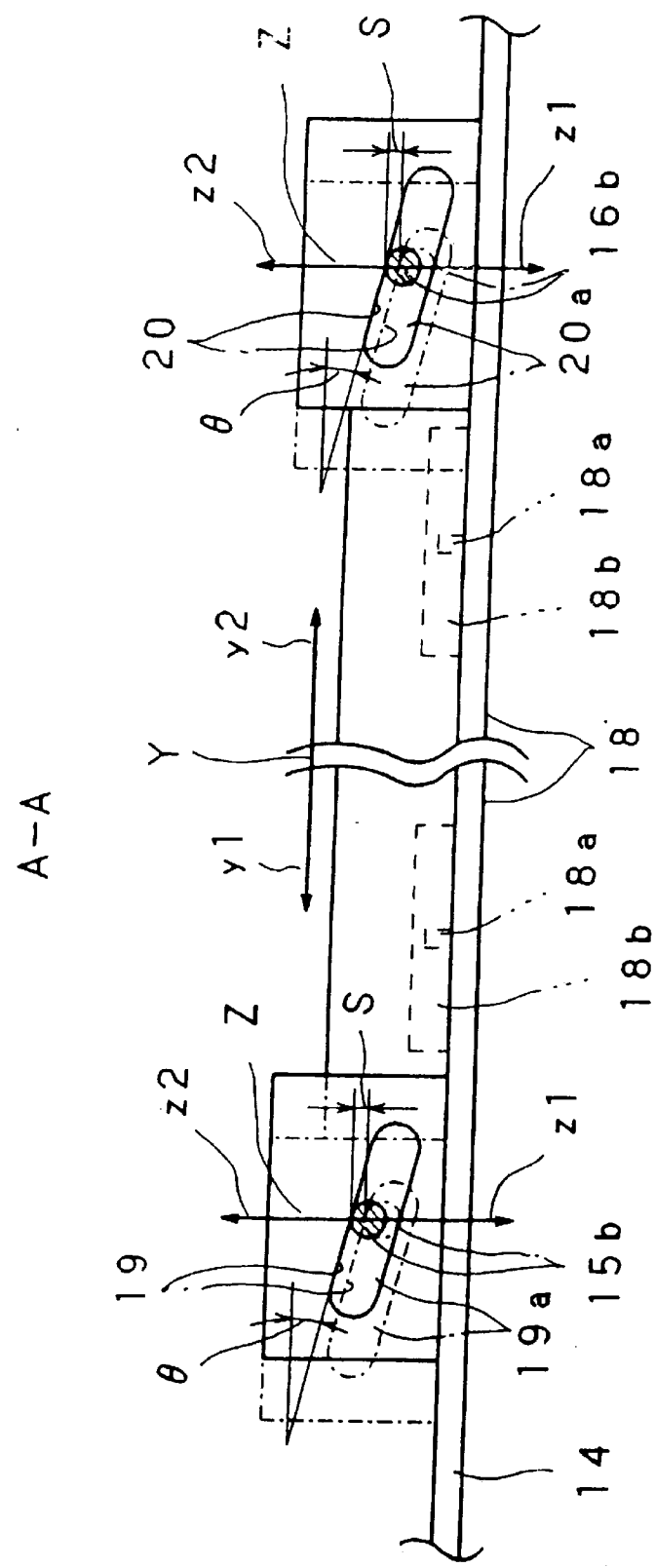
FIG. 7 presents a partially cut off enlarged front view corresponding to an arrow line A—A shown in FIG. 5 for explanatory of the Z-directional vertical movement of the other end portion of a pair of guide shaft members via the first and second cam surfaces of a sliding cam shown in FIG. 2.

Then, as shown in FIG. 7, the first and second cam surfaces 19 and 20 of the sliding cam 18 jointly skewed by the same angle θ are simultaneously shifted in the Y-direction via sliding movement. This causes one end portions 15b and 16b of a pair of the guide shaft members 15 and 16 elastically pressed against the first and second cam surfaces 19 and 20 by a pair of pre-pressuring springs 26 to be vertically shifted in the Z-direction by an identical height.

More particularly, one end portions 15a and 16a of a pair of the guide shaft members 15 and 16 are individually supported by a pair of the pivot members 17 above the chassis 14, whereas those positions close to the other end portions 15b and 16b are vertically guided in the Z-direction via the vertical guide slits 25b of a pair of the guide members 25. Accordingly, as shown in FIG. 7 via a one-dot chained line, when the sliding cam 18 is shifted from the reference position shown by a solid line to the X1 direction, the other end portions 15b and 16b of a pair of the guide shaft members 15 and 16 are lowered by the first and second cam surfaces 19 and 20 in the downward direction Z1 by the same amount S against the pre-pressuring springs 26. Conversely, when the sliding cam 18 is slidably shifted in the arrow y2 direction opposite from the reference position shown by a solid line, by way of following up the first and second cam surfaces 19 and 20, the other end portions 15b and 16b of the guide shafts 15 and 16 are 10 individually lifted in the upper direction Z2 by the same amount S by the pre-pressuring springs 26.

Figure 8:
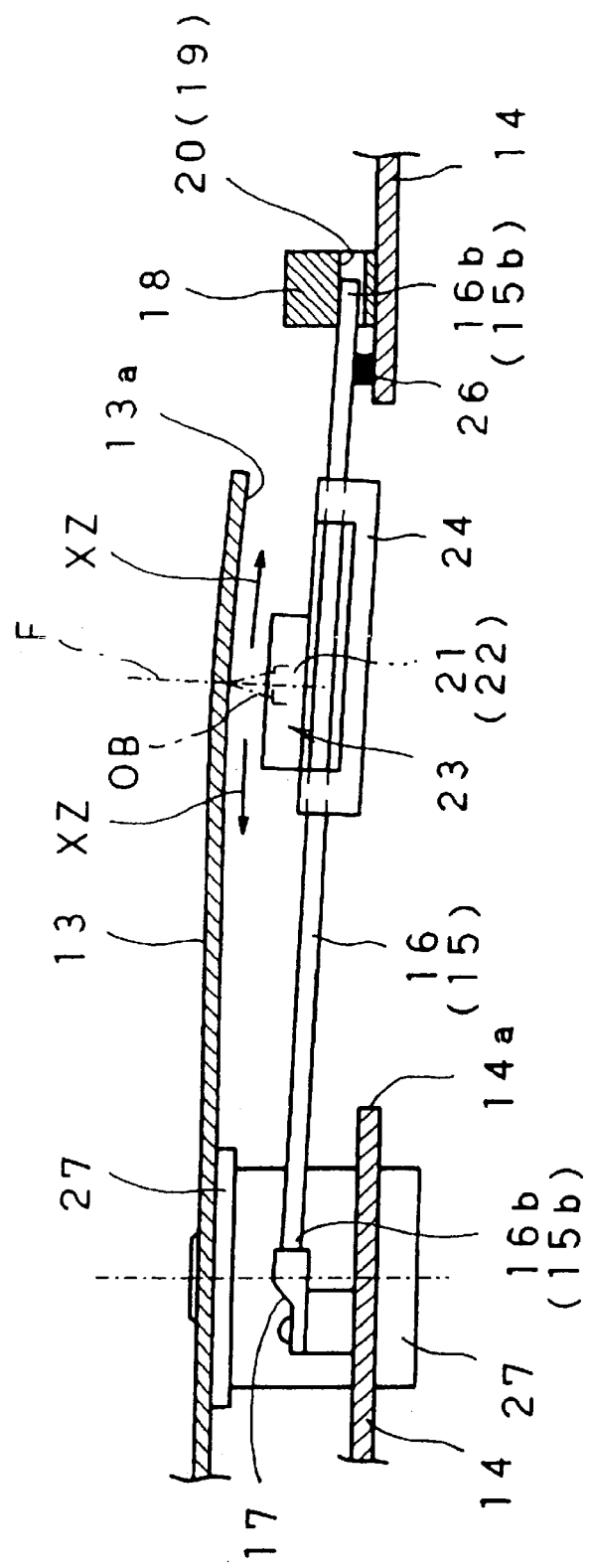
FIG. 8 presents a partially cut off enlarged front view corresponding to an arrow line B–B shown in FIG. 5 for explanatory of the Z-directional rotary movement by way of pivoting on a pivot portion at one end of a pair of guide shaft members via the first and second cam surfaces of a sliding cam shown in FIG. 2.

By virtue of the above arrangement, as shown in FIG. 8, a pair of the guide shaft members 15 and 16 are skewed by the same angle in the vertical XZ direction synthesized by the X and Z directions by way of pivoting on the pivot members 17 above the chassis 14. While the above process is underway, distortion may be generated between the coupling member 31 of the sled 24 and the helical groove 30a of the lead screw 30. However, such distortion can fully be absorbed by causing a pre-pressuring spring 31a to press the coupling member 31 against the lead screw 30.

The optical pickup unit 23 is mounted on the sled 24 which is shifted in the X-direction via guidance of a pair of the guide shaft members 15 and 16. The optical F of the optical beams OB emitted from the optical pickup unit 23 follow up the vertical-directional skew of the signal surface 13a of the optical disc 13, whereby making it possible to execute the radial skew controlling operation to enable the optical axis F to be constantly perpendicular to the signal surface 13a of the optical disc 13. Based on the result detected by the skew detecting means, the above skew servo controlling operation is executed as an initial setting prior to the recording or reproduction of audio/video data onto or from the optical disc 13. In addition, if the skew detecting means detects skew of the optical disc 13, even when the recording or reproduction process is underway, the skew servo controlling operation can be executed based on the result detected during the recording or reproduction process. By way of executing the skew servo controlling operation, it is possible to maintain and compensate for the angular posture of the optical axis F of the optical beams OB to be constantly perpendicular to the signal surface 13a of the optical disc 13, whereby making it possible to significantly improve performance in regard to recording and/or reproduction (so-called reading and writing) of audio/video data onto and/or from a high-density optical disc 13 such as a DVD, for example.

Figure 9:
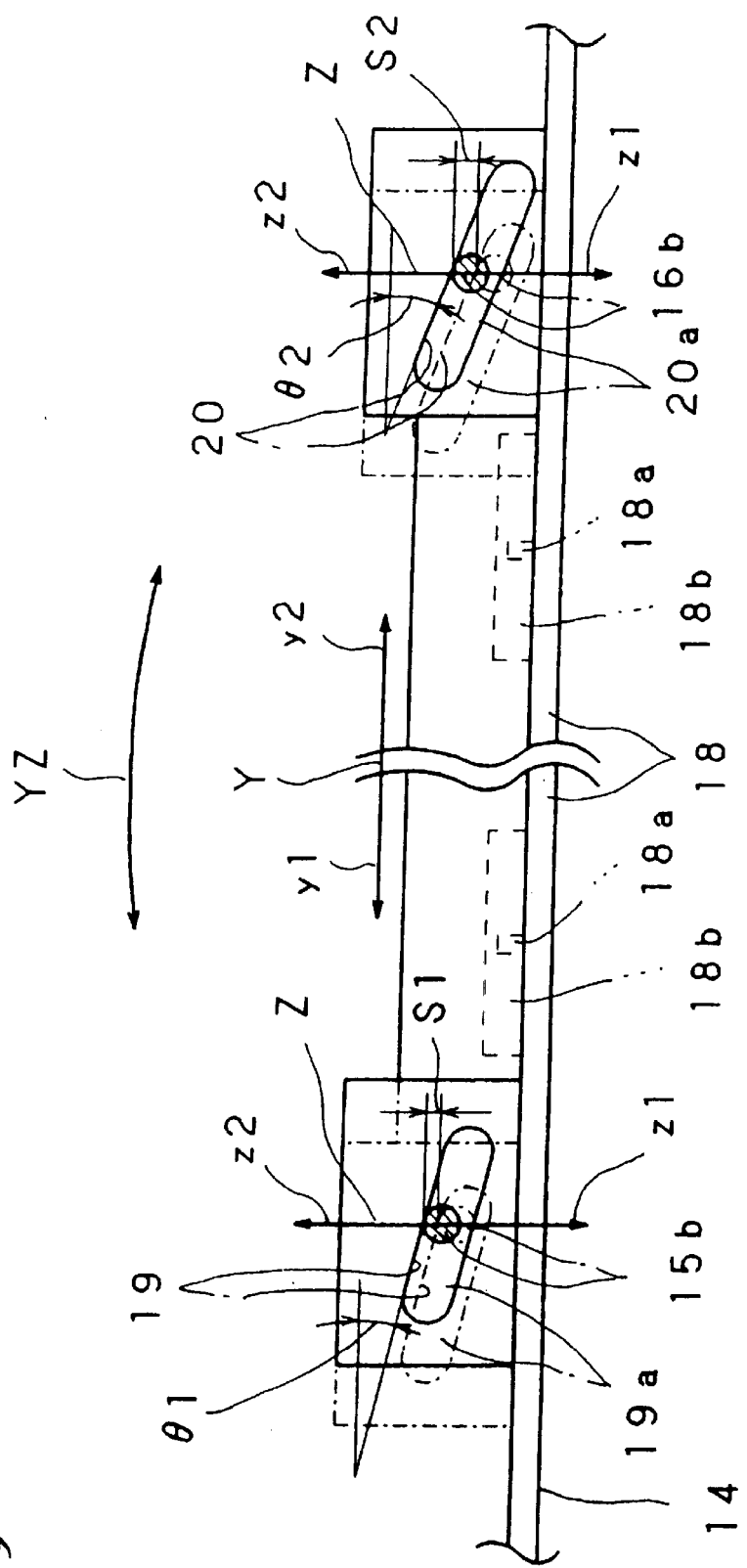
FIG. 9 presents a partially cut off enlarged front view similar to the one shown in FIG. 7 for explanatory of the Z-directional vertical movement at the other end of a pair of guide shaft members via the first and second cam surfaces of a sliding cam according to the second practical form of the skew servo mechanism introduced to the optical disc drive apparatus related to the present invention.
Figure 10:
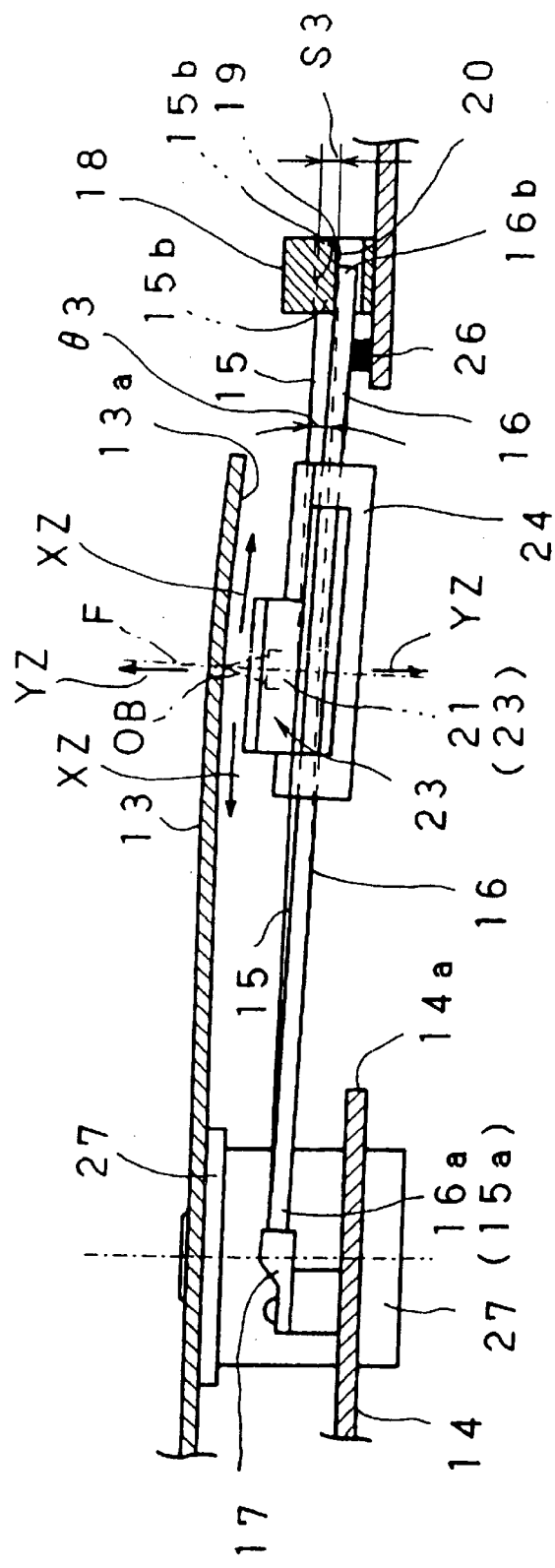
FIG. 10 presents a partially cut off enlarged view similar to the one shown in FIG. 8 for explanatory of the Z-directional rotary movement by way of pivoting on a pivot potion at one end of a pair of guide shaft members via the first and second cam surfaces of a sliding cam shown in FIG. 9.

[3] Description on the second practical form of the skew servo mechanism:

Referring now to FIGS. 9 and 10, the second practical form of the skew servo mechanism is described below.

In the second practical form of the skew servo mechanism M1, the first and second cam surfaces 19 and 20 formed at both end portions of the sliding cam 18 described earlier in regard to the first practical form are arranged at mutually different skew angle θ1 and angle θ2. Because of this arrangement, the second practical form makes it possible to execute the bi-directional skew servo controlling operations including radial-directional skew servo for the optical axis F of the optical beams OB emitted from the optical pickup unit 23 against the signal surface 13a thereof and the tangential-directional skew servo being orthogonal to the radial direction. The remaining structure of the skew servo mechanism M1 according to the second practical form is exactly identical to that of the first practical form described above. In the second practical form of the skew servo mechanism M1, inasmuch as the first and second cam surfaces 19 and 20 of the sliding cam 18 are disposed at mutually different skew angle θ1 and angle θ2, when the sliding cam 18 is shifted in the Y-direction by the sliding cam driving means m1 based on the result detected by the skew detecting means 32, such a difference S3 (S3=S1−S2) is generated between Z directional height S1 of one end portion 15a of the guide shaft member 15 which is generated via the first cam surface 19 having own skew angle θ1 and also generated via the pre-pressuring spring 26 and the other Z-directional height S2 of the other end portion 16b of the other guide shaft member 16 which is generated by the second cam surface 20 having own skew angle θ2 and also generated by the pre-pressuring spring 26.

Simultaneously, another difference θ3 is generated in the Z-directional skew angles centering a pair of the pivot members 17 of a pair of the guide shaft members 15 and 16, whereby causing the sleds 24 of the optical pickup unit 23 held by the guide shaft members 15 and 16 to be skewed in two directions including the XZ direction synthesized by the radial X direction and the YZ direction and the YZ direction synthesized by the tangential Y direction and the Z direction. Because of this arrangement, the second practical form makes it possible to execute the bi-directional skew controlling operations by way of controlling the angular position of the optical axis F of the optical beams OB focused onto the signal surface 13a of the optical disc 13 after being emitted from the optical pickup unit 23 in the radial XZ direction and the tangential YZ direction in both ways.

While executing a focus servo controlling operation by adjustably changing distance of a pair of the object lenses 21 and 22 against the signal surface 13a of the optical disc 13, the tangential-directional skew of the optical axis F of the optical beams OB may be generated against the signal surface 13a of the optical disc 13.

To prevent the occurrence of the tangential skew, it is so arranged that the tangential-directional skew of the optical axis F of the optical beams OB against the signal surface 13a is previously acquired via calculation or an experiment, and then, in order that the tangential-directional skew of the optical axis F of the optical beams OB against the signal surface 13a can be canceled, it is possible to previously design the skew angles θ1 and θ2 of the first and second cam surfaces 19 and 20. This in consequence makes it possible to execute an extremely precise skew servo controlling operation to properly adjust the optical beams OB emitted from the optical pickup unit 23 to be constantly perpendicular to the signal surface 13a of the optical disc 13.

Figure 11:
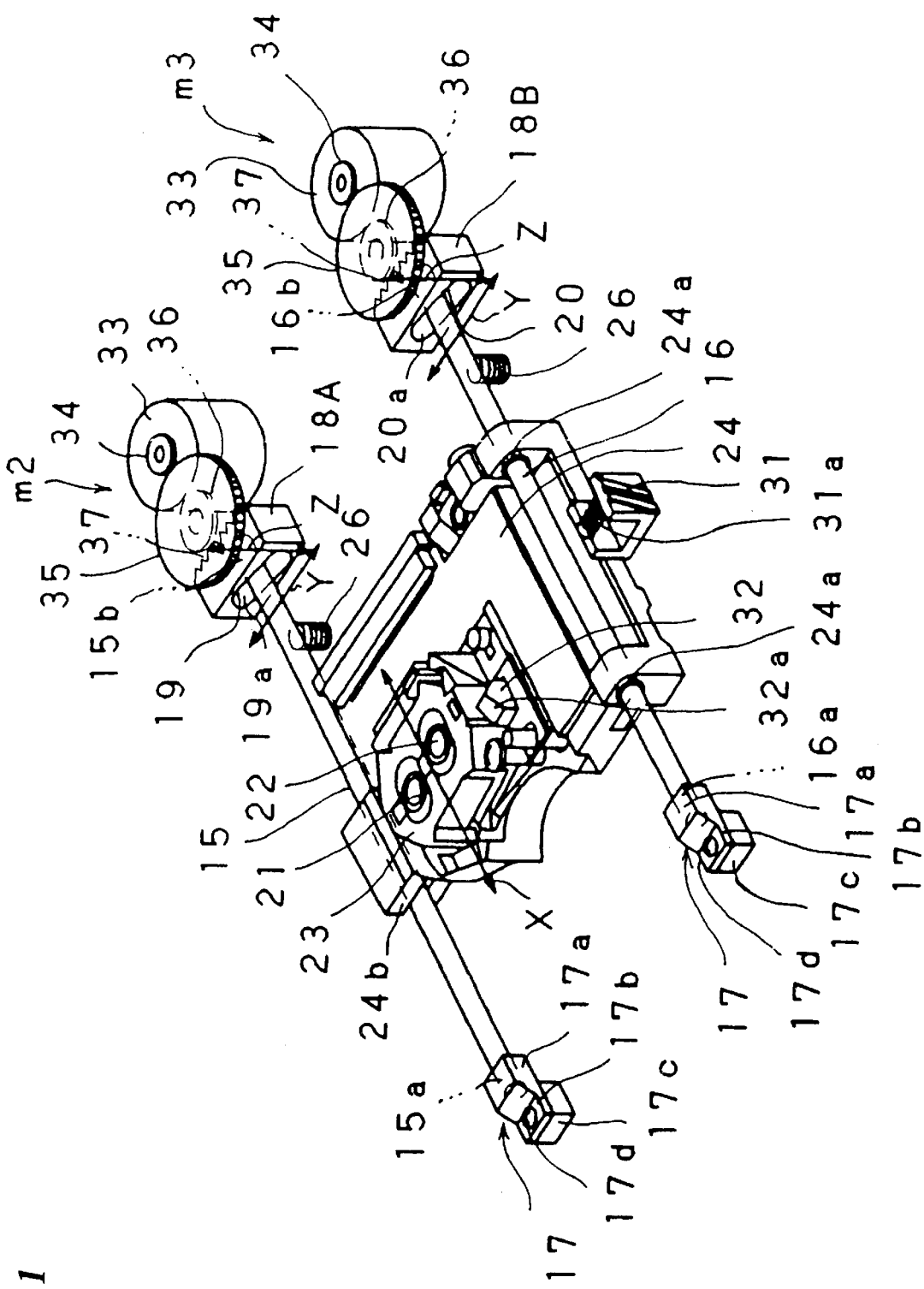
FIG. 11 presents a perspective view of the skew servo mechanism for explanatory of the third practical form of the skew servo mechanism introduced to the optical disc drive apparatus related to the present invention.

[4] Description on the third practical form of the skew servo mechanism:

Referring now to FIG. 11, the third practical form of the skew servo mechanism is described below.

In the third practical form of the skew servo mechanism M1, a pair of the mutually independent sliding cams 18A and 18B are mounted on rear-end portions of the chassis 14. The first and second cam surfaces 19 and 20 are independently formed on the sliding cams 18A and 18B. One end portions 15b and 16b of a pair of the guide shaft members 15 and 16 are elastically pressed against the first and second cam surfaces 19 and 20 by a pair of pre-pressuring springs 26. The above sliding cams 18A and 18B are independently driven in the Y direction by a pair of the independently driven sliding-cam driving means m2 and m3 which are respectively mounted on the rear-end portions of the chassis 14. These sliding cam driving means m2 and m3 are respectively of such a structure identical to that of the sliding cam driving means m1 described earlier in relation to the first and second practical forms. The remaining structural components of the sliding cam driving means m2 and m3 are also identical to those which are shown in the first and second practical forms. According to the third practical form of the skew servo mechanism M1, based on the result detected by the skew detecting means 32, it is possible to simultaneously and/or individually drive a pair of the sliding cams 18A and 18B in the Y direction by a pair of the sliding cam driving means m2 and m3 to cause a certain difference to be generated in the Z-directional skew angles centering a pair of pivot members 17 of a pair of the guide shaft members 15 and 16 in correspondence with variation in the Y-directional relative phases of a pair of the sliding cams 18A and 18B.

Because of the above arrangement, as described earlier in regard to the preceding second practical form, it is also possible for the third practical form to execute the bi-directional angular controlling operations by way of controlling angular position of the optical axis F of the optical beams OB focused onto the signal surface 13a of the optical disc 13 in the radial XZ direction and in the tangential YZ direction. In the third practical form of the skew servo mechanism M1, the skew angles of the first and second cam surfaces 19 and 20 may be identical to each other or different from each other.

Figure 12:
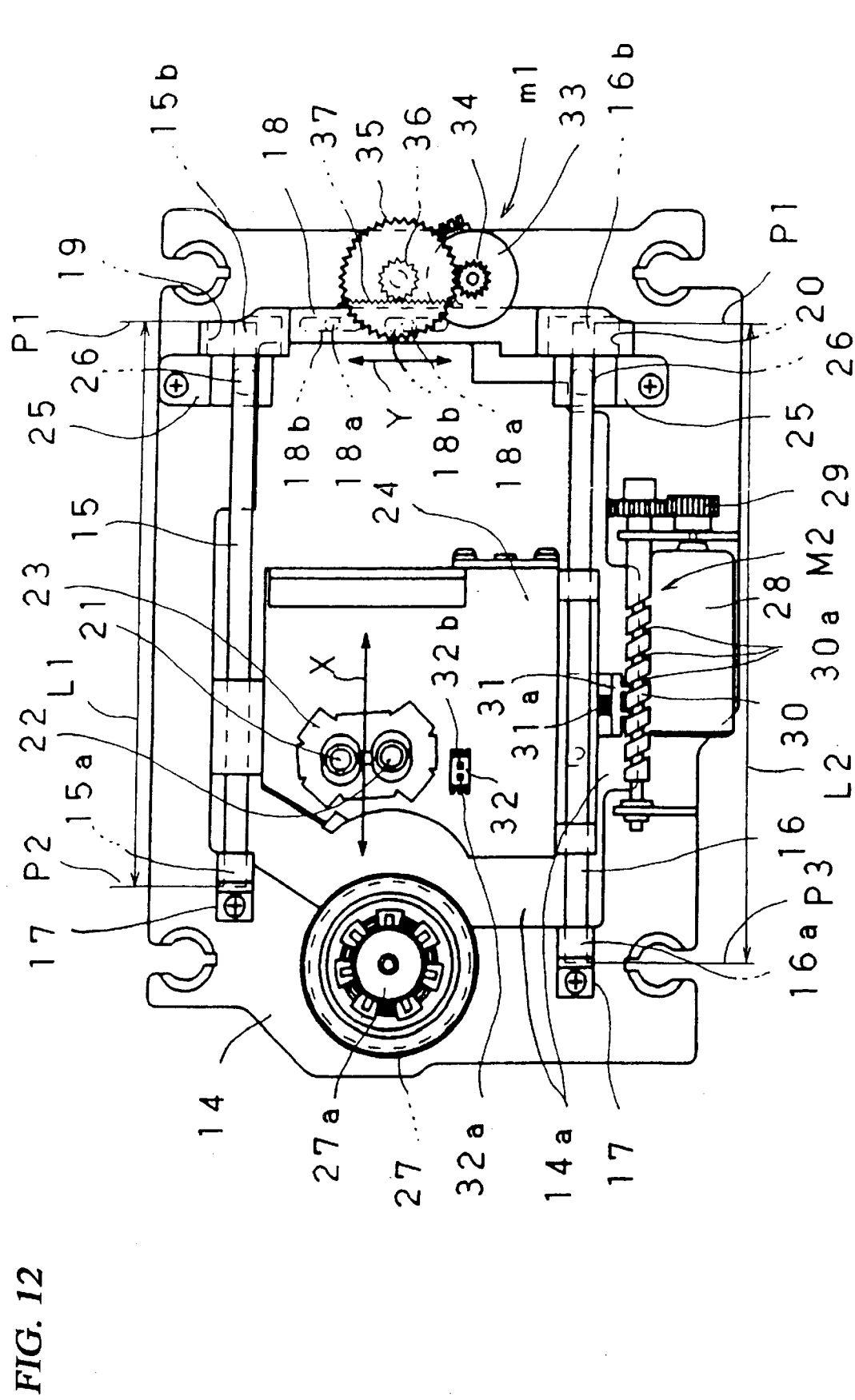
FIG. 12 presents a plan view of the skew servo mechanism for explanatory of the fourth practical form of the skew servo mechanism introduced to the optical disc drive apparatus related to the present invention.
Figure 13:
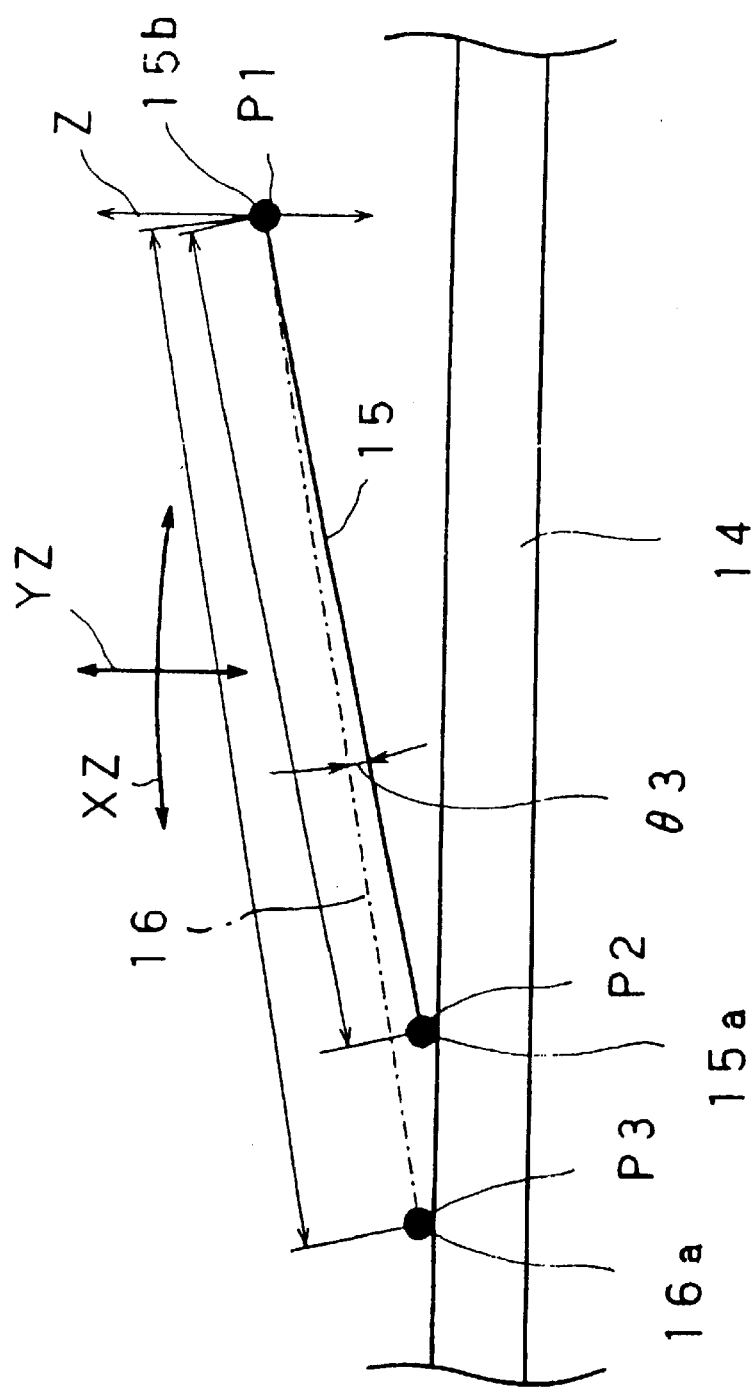
FIG. 13 presents a lateral view for explanatory of the Z-directional rotary movement by way of pivoting on a pivot portion at one end of a pair of guide shaft members via a sliding cam shown in FIG. 12.
Figure 14:
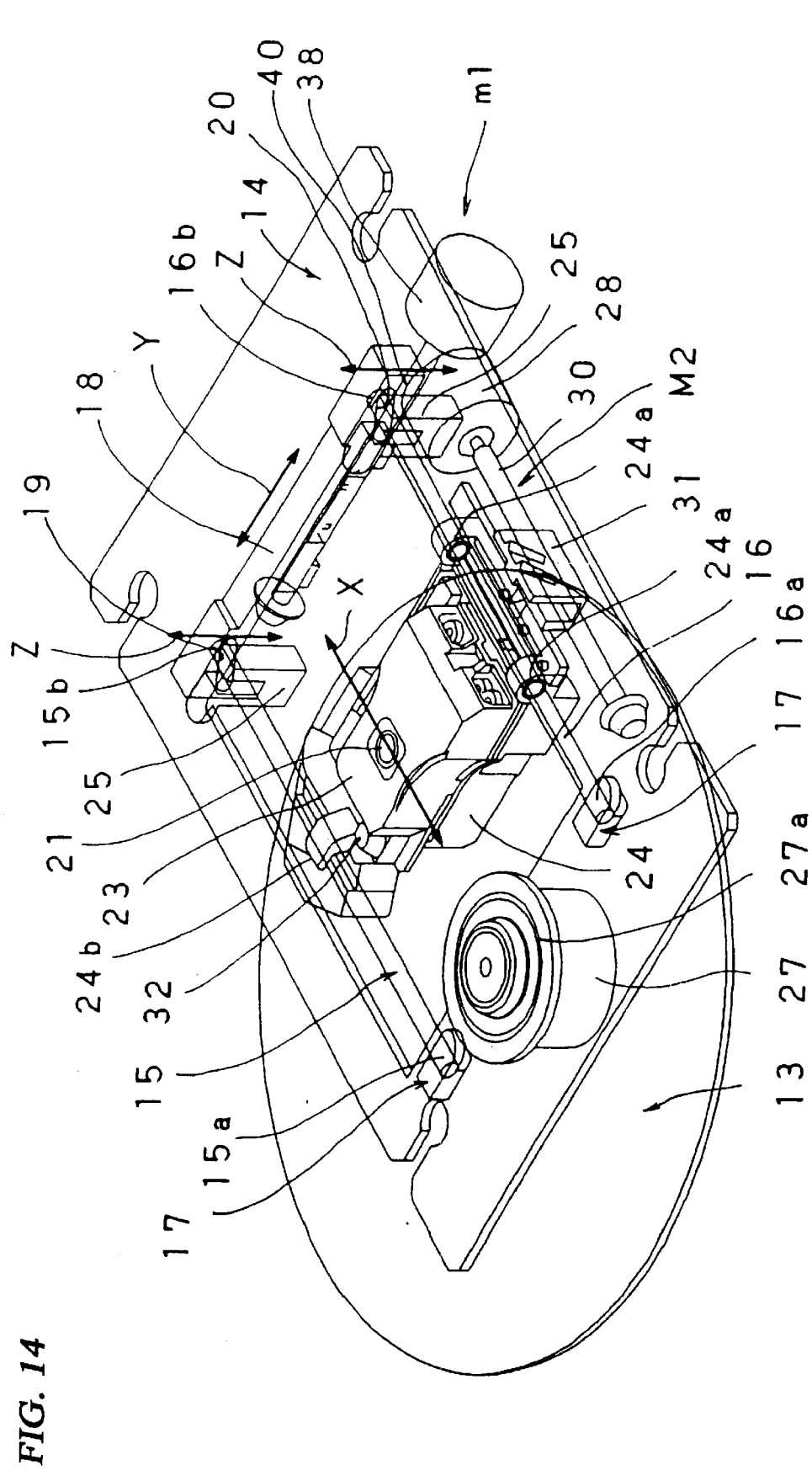
FIG. 14 presents a perspective view of the skew servo mechanism for explanatory of the fifth practical form of the skew servo mechanism introduced to the optical disc drive apparatus related to the present invention.
Figure 15:
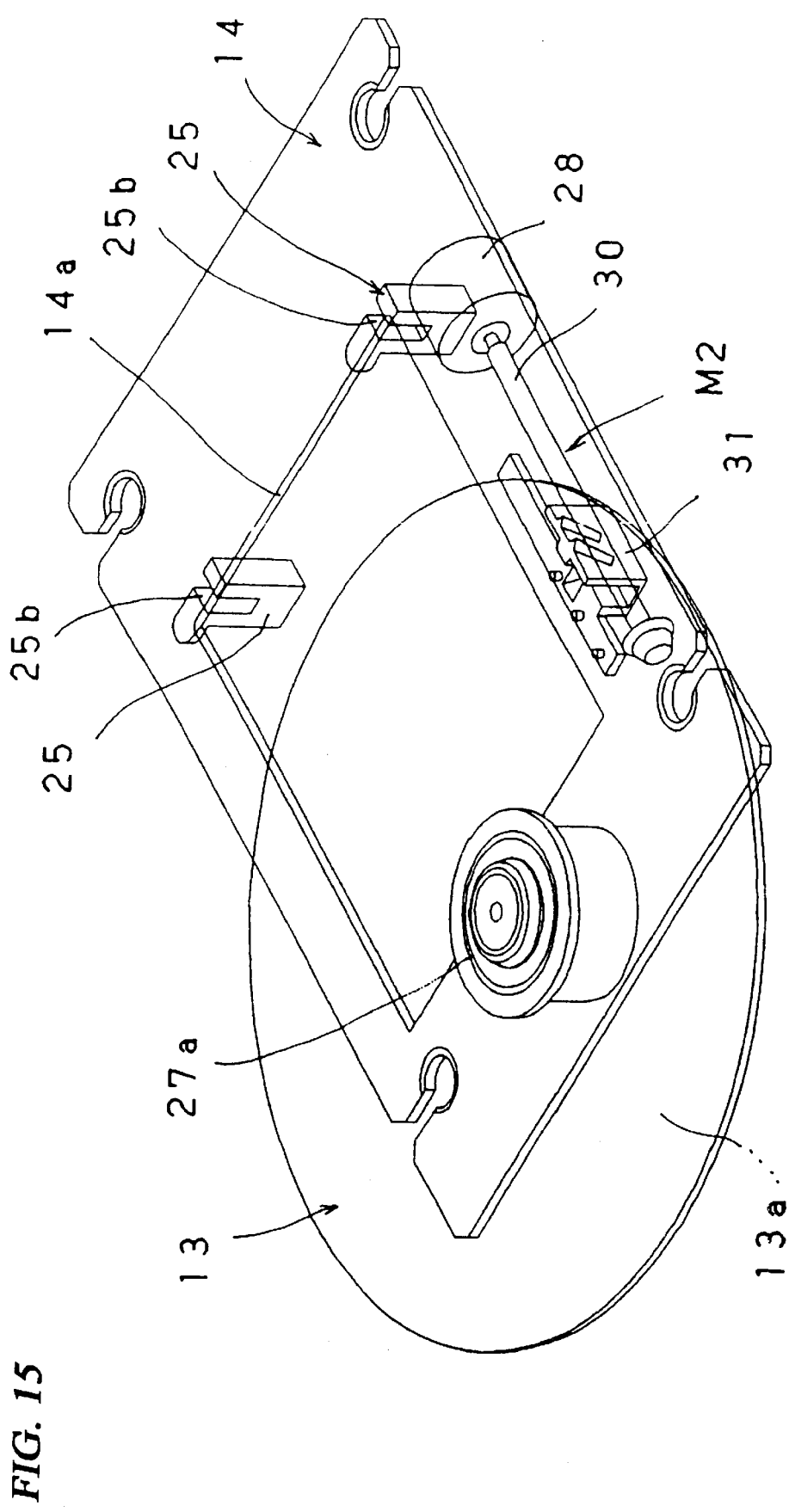
FIG. 15 presents a perspective view of a chassis for mounting the skew servo mechanism and a sled driving mechanism shown in FIG. 14.
Figure 16:
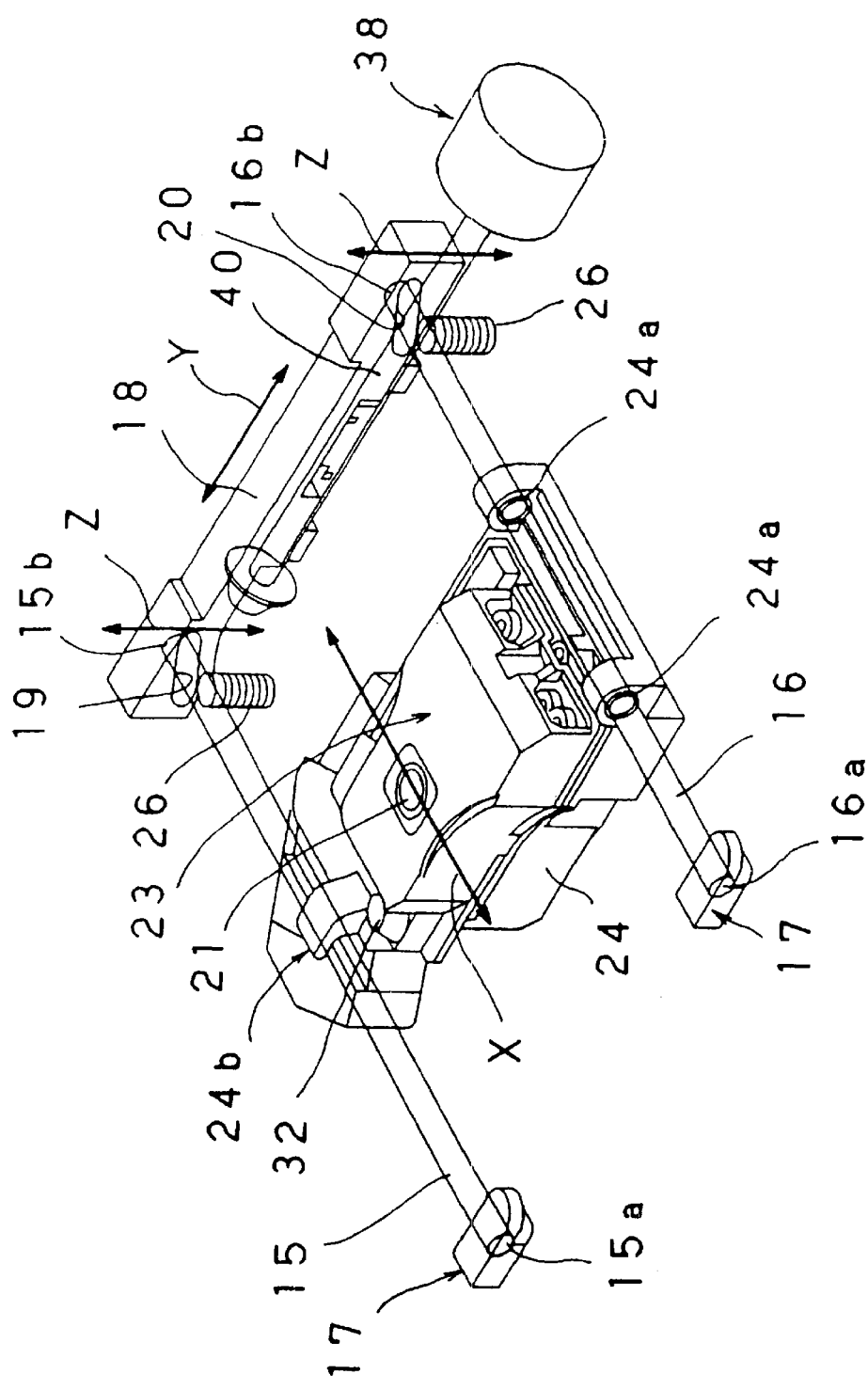
FIG. 16 presents a perspective view of the skew servo mechanism solely shown in FIG. 14.
Figure 17:
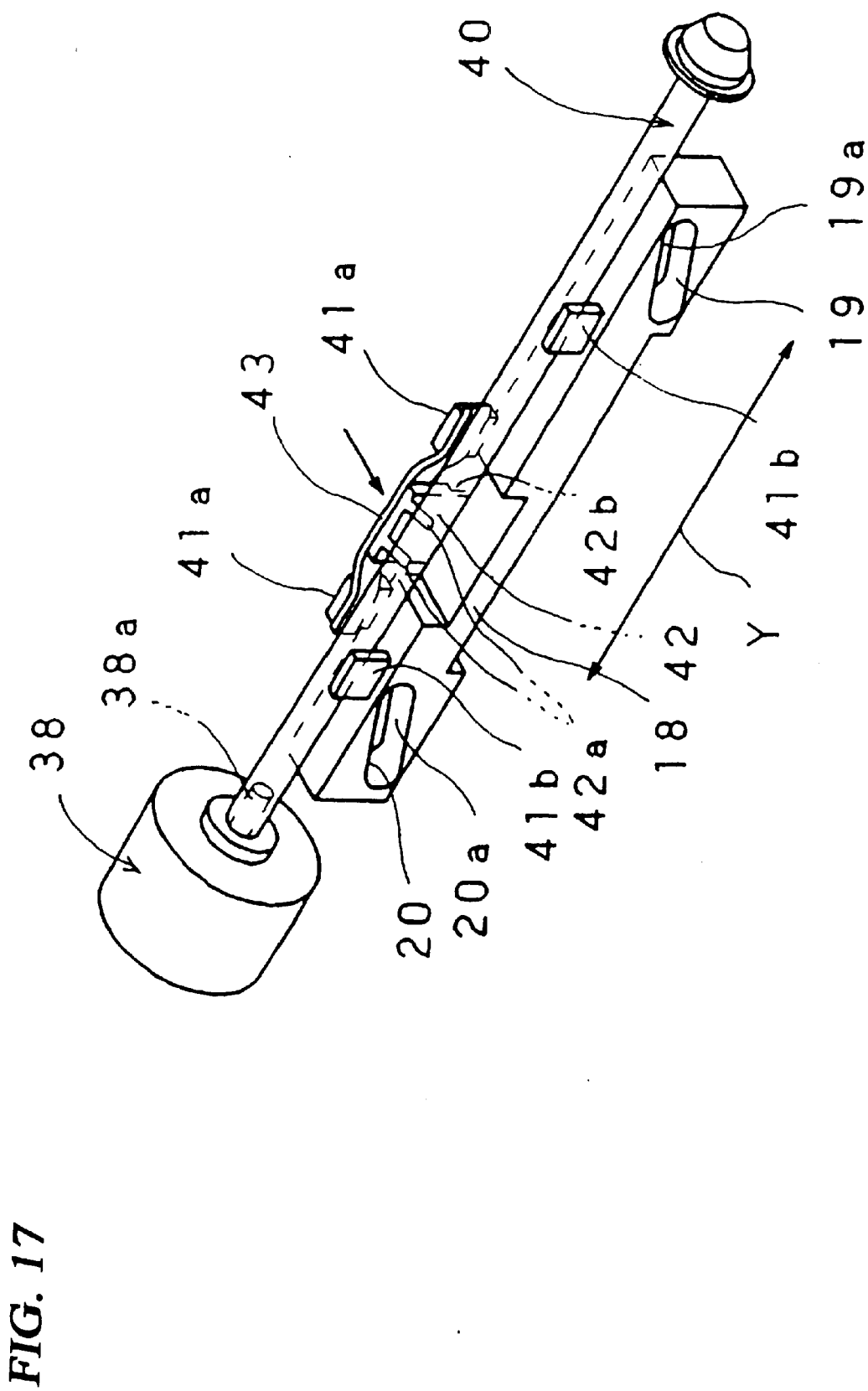
FIG. 17 presents an upside-down inverted perspective view of a sliding cam driving means provided for the skew servo mechanism shown in FIG. 16.
Figure 18:
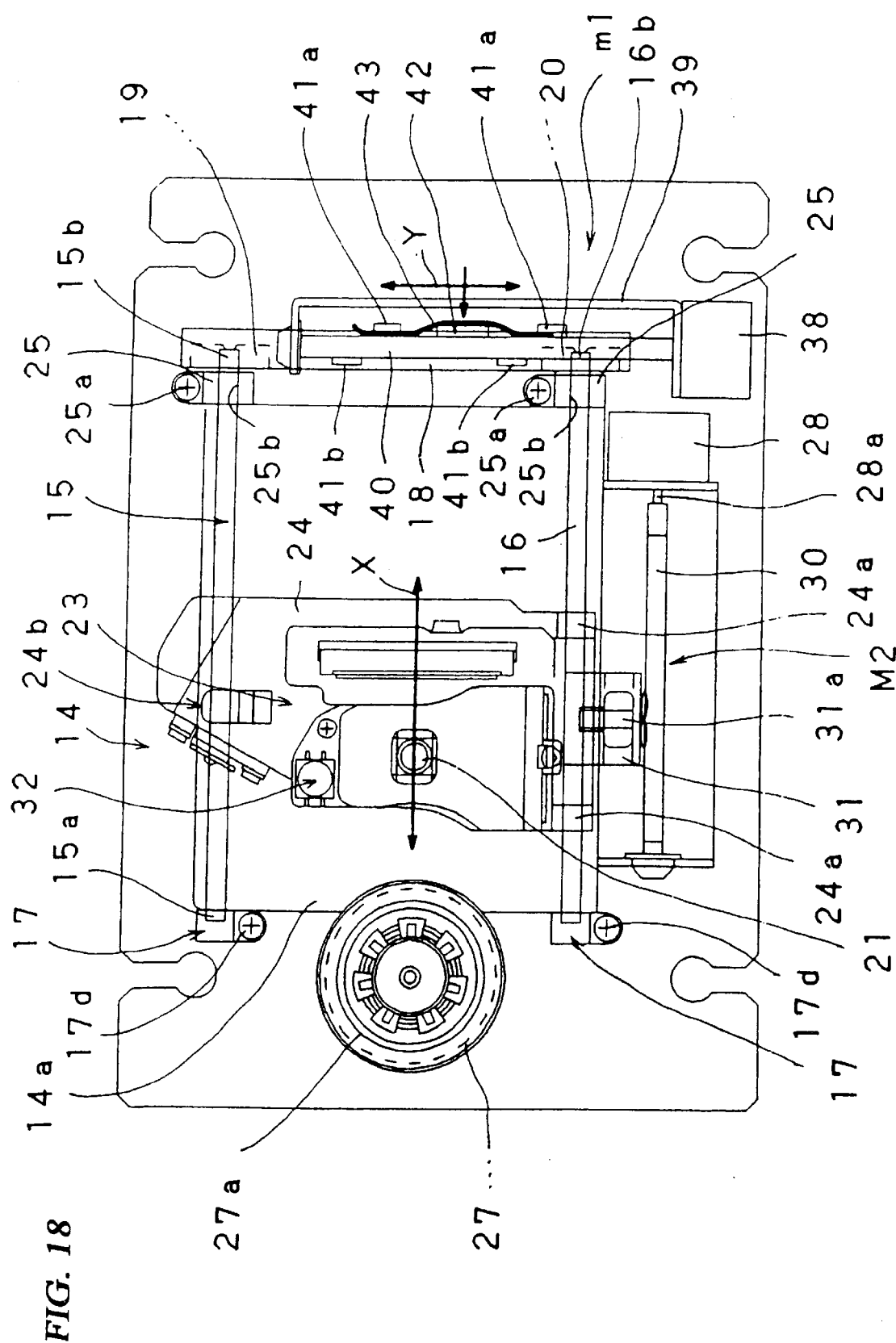
FIG. 18 presents a perspective view of the whole skew servo mechanism shown in FIG. 14.

[5] Description on the fourth practical form of the skew servo mechanism:

Referring now to FIGS. 12 and 13, the fourth practical form of the skew servo mechanism is described below.

In the fourth practical form of the skew servo mechanism M1, one end portions 15b and 16b of a pair of the guide shaft members 15 and 16 are disposed to an identical X-directional position P1, where one end portions 15b and 16b are individually and elastically pressed against the first and second cam surfaces 19 and 20 by the corresponding pre-pressuring springs 26 whereby enabling the other end portions 15a and 16a of the guide shaft members 15 and 16 to be secured to a pair of the supporting members 17a of a pair of the pivot members 17 secured onto mutually different X-directional positions P2 and P3 at the front end portion of the chassis 14. The remaining structural components of the fourth practical form are exactly identical to those of the first practical form described earlier.

As described above, by virtue of the above arrangement in which one end portions 15b and 16b of a pair of the guide shaft members 15 and 16 are disposed to X-directional identical positions P1 to cause the other end portions 15b and 16b of the guide shaft members 15 and 16 to be elastically pressed against the first and second can surfaces 19 and 20 by the corresponding pre-pressuring springs 26, whereby enabling one end portions 15a and 16a of the guide shaft members 15 and 16 to be secured to supporting members 17a of a pair of the pivot members 17 secured onto mutually different X-directional positions P2 and P3 at the front end portion of the chassis 14, a certain difference θ3 is generated in the skew angle of a pair of the guide shafts 15 and 16 which are rotated in the Z-direction by way of pivoting on a pair of the pivot members 17 via the first and second cam surfaces 19 and 20 and a pair of the pre-pressuring springs 26 by way of driving the sliding cam 18 in the Y direction via the sliding cam driving means m1 based on the result detected by the slew detecting means 32. Thereby, as described earlier in regard to the second practical form, the sleds 24 of the optical pickup unit 23 held by a pair of the guide shaft members 15 and 16 are skewed in two directions including the radial and tangential directions. Accordingly, it is possible for the fourth practical form of the skew servo mechanism M1 to precisely control angular position of the optical axis F of the optical beams OB focused onto the signal surface 13a of the optical disc 13 and emitted from the optical pickup unit 23 via two directions including the radial XZ direction and the tangential YZ direction The skew angles of the first and second cam surfaces 19 and 20 in the fourth practical form may be identical to each other or different from each other.

[6] Description on the fifth practical form of the skew servo mechanism:

Referring now to FIGS. 14 to 20, the fifth practical form of the skew servo mechanism is described below.

In the fifth practical form of the skew servo mechanism M1, a stepping motor 38 is utilized to serve as a skew motor for driving the sliding cam driving means ml. The above-described sliding cam 18 is driven by a lead screw 40 rotated by the stepping motor 38. The sled driving mechanism M2 does not require a plurality of gears 29 by virtue of utilization of the stepping motor 38 in place of the above skew motor 28. The remaining structural components are identical to those of the second practical form as described earlier. However, in this fifth practical form, the skew servo mechanism M1 and the sled driving mechanism M2 are individually set to the bottom surface of the chassis 14 in the state of upside down in the sliding cam driving means m1 of the second practical form as described earlier where the sliding cam driving means m1 includes the sliding cam 18 having a pair of the guide shaft members 15 and 16, a pair of the pivot members 17, and the first and second cam surfaces 19 and 20 having mutually different skew angles and also the stepping motor 38.

Alternatively, as done for the first to fourth practical forms, it is also possible to mount the skew servo mechanism M1 and the sled driving mechanism M2 on the upper surface of the chassis 14.

In the sliding cam driving means m1, the stepping motor 38 is secured to an end of a substantially ⊐ shaped motor-fixing frame 39 made of a metal plate secured to the bottom surface of the chassis 14. An end of the lead screw motor 40 is directly coupled with the motor shaft 38a of the stepping motor 38, whereas the other end of the lead screw motor 40 is rotatably secured to the other end of the motor-fixing frame 39. The lead screw 40 is horizontally and rotatably secured to the bottom portion of the chassis 14 in the direction orthogonal to a pair of the guide shafts 15 and 16. The sliding cam 18 made, from plastics is secured to the bottom portion of the chassis 14 above and in parallel with the lead screw 40. The sliding cam 18 is slidably driven in the direction in parallel with the lead screw 40 via guidance of such a sliding guide mechanism comprising a pair of guide pins 18a vertically secured to the bottom surface of the chassis 14 across an interval and a pair of the guide pins 18a formed on the upper surface of the sliding cam 18 across an interval Four of integrally formed sliding guide members 41a and 41b consisting of two pairs are vertically disposed in the axial direction of the lead screw 40 across intervals in the front/rear and both-side positions of the lead screw 40. These four sliding guide members 41a and 41b are slidably abutted with the front/rear and both-side portions of the lead screw 40.

Figure 19:
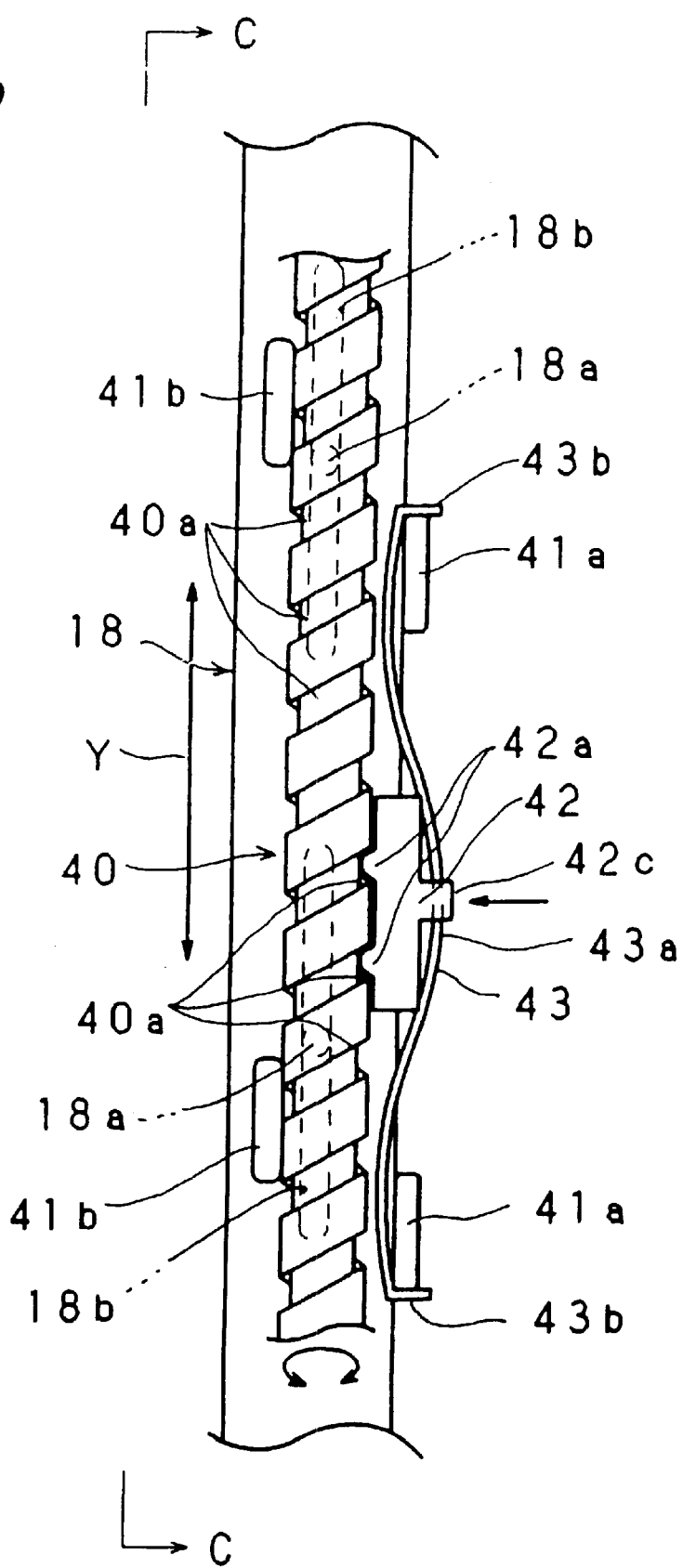
FIG. 19 presents an enlarged bottom view of the coupling portion between a lead screw and a coupling member of the sliding cam driving means shown in FIG. 18.
Figure 20:
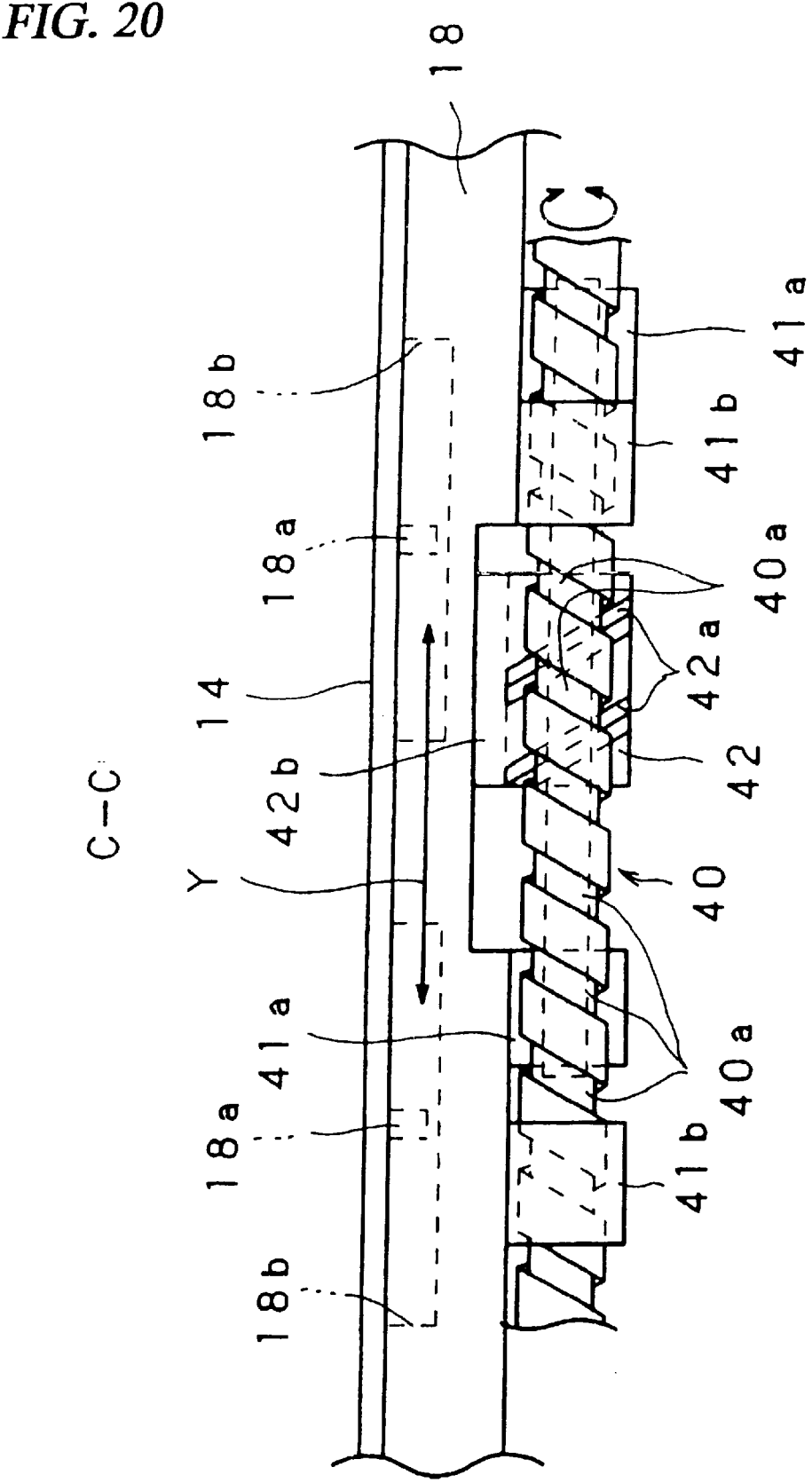
FIG. 20 presents a front view corresponding to an arrow line C—C shown in FIG. 19.
Figure 21:
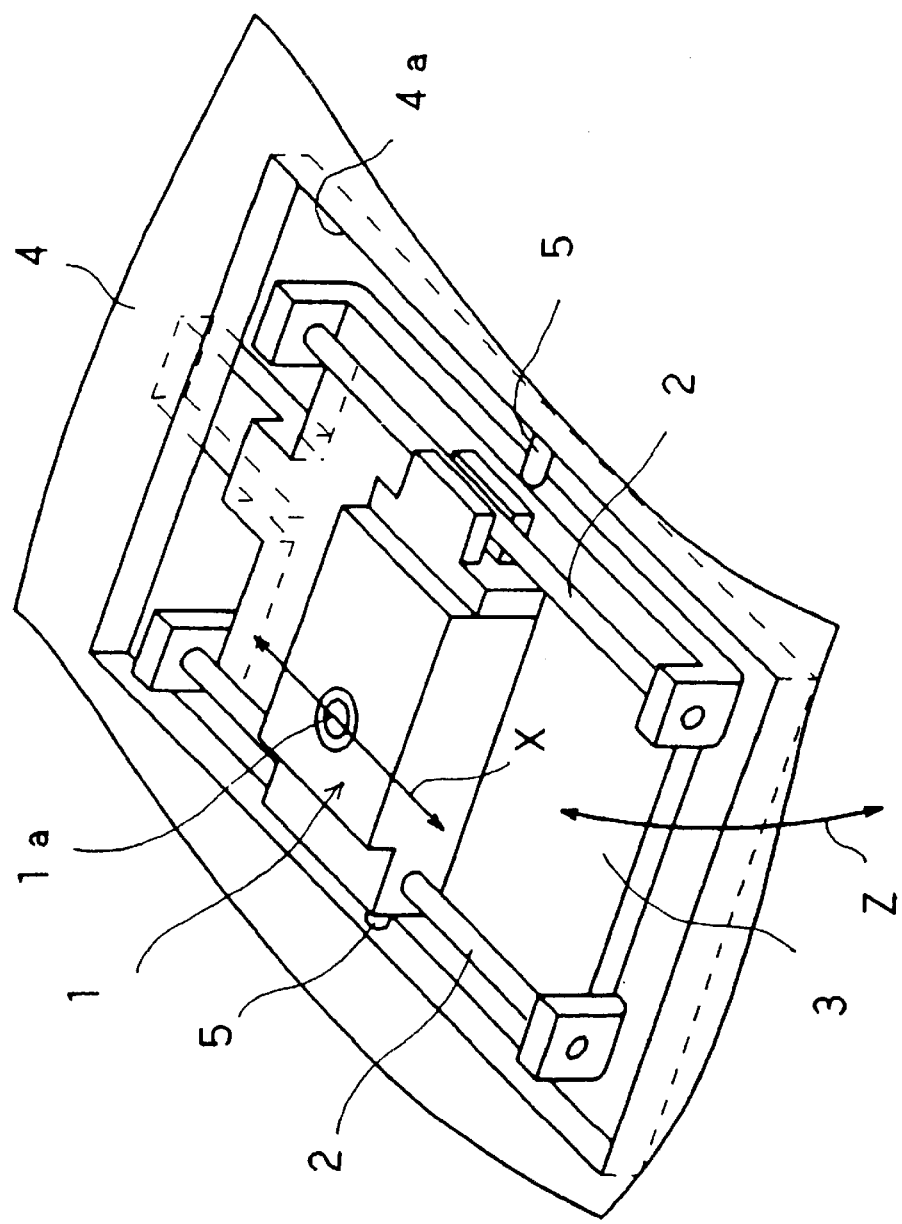
FIG. 21 presents a perspective view for explanatory of the skew servo mechanism introduced to a conventional optical disc drive apparatus.

A rack-formed coupling member 42 is vertically and integrally formed on the bottom surface of the sliding cam 18 at substantially center position between a pair of the sliding guide members 41a on the rear side. The rack-formed coupling member 42 is coupled with a helical groove 40a formed in the lead screw 40 from the rear side. A pair of helical gears 42a are integrally formed in the coupling member 42. The coupling member 42 is integrally formed on the bottom surface of the sliding cam 18 via a thin elastic member 42b to enable a pair of the helical gears 42a to be elastically coupled with two portions of the helical groove 40a of the lead screw 40 for example. Further, the coupling member 42 is elastically pressed by an elastic pressuring means comprising a pre-pressuring spring 43 whereby stably coupled with the helical groove 40a of the lead screw 40. A compressed coil spring may also be utilized for the pre-pressuring spring 43. Alternatively, as shown in FIG. 19 for example, it is also allowable to utilize such pre-pressuring spring 43 comprising a plate spring or a linear spring by way of causing both ends 43b of the pre-pressuring spring 43 to be engaged with the inner side of a pair of the sliding guide members 41a of the sliding cam 18. Accordingly, the coupling member 42 is elastically pressed via the center portion 43a of the pre-pressuring spring 43 to enable the both sides 43a of the spring 43 to be stably coupled with the helical groove 40a.

The skew servo mechanism M1 according to the fifth practical form comprises the above-described structural components. As described for the second practical form, whenever the skew detecting means 32 detects the vertical directional skew of the signal surface of the optical disc 13, in correspondence with the skew value of the signal surface 13a, a series of pulse current corresponding to a preset value flows through the stepping motor 38, and then, rotation of the stepping motor 38 is so controlled that the lead screw 40 can be carried forward by a specific pitch corresponding to the preset number of the rotation.

In response to this, pitch of the sliding cam 18 coupled with the helical groove 40a of the lead screw 40 via the coupling member 42 is carried forward by such a sliding amount preset in the Y direction. Then, one end portions 15b and 16b of a pair of the guide shaft members 15 and 16 are vertically driven in the Z direction by such a mutually different lifting and lowering amount by means of a pair of the cam surfaces 19 and 20 on both sides of the sliding cam 18, where the skew angles of the cam surfaces 19 and 20 are different from each other.

Because of this vertical movement, as mentioned earlier, the angular positions of a pair of the guide shaft members 15 and 16 are adjusted into such skew angles mutually different from each other in the Z direction by way of pivoting on the each pivot member 17, whereby executing bi-directional skew adjustment of the sleds 24 in the radial and tangential directions. Accordingly, by enabling the optical axis F of the optical beams OB emitted from the optical pickup unit 23 to follow up the bi-directional skew of the signal surface 13a of the optical disc 13 in the radial XZ direction and in the tangential YZ direction, operation for controlling the radial skew and the tangential skew is executed in order that the optical axis F of the optical beams OB can constantly become perpendicular to the signal surface 13a of the optical disc 13.

As described above in regard to the fifth practical form of the skew servo mechanism M1, by way of arranging such a system to cause the lead screw 40 rotated by the stepping motor 38 to carry pitch of the sliding cam 18 forward in the Y direction, it is possible to quickly shift the sliding cam 18 in the Y direction in anticipation of the skewed value of the signal surface 13a of the optical disc 13 detected by the skew detecting means 32. Accordingly, it is possible to execute the skew servo control operation much faster than ever before, whereby further improving the performance in the recording and/or reproduction of audio/video data onto and/or from the high-density optical disc 13 such as a DVD or the like.

Further, by way of directly connecting the motor shaft 38a of the stepping motor 38 to an end of the lead screw 40 and by way of disposing the sliding cam 18 in parallel with the lead screw 40 in the Y direction by superposing the sliding cam 18 on the lead screw 40, it is possible to contract X-directional depth-wise dimension corresponding to the front-rear direction of the skew servo mechanism M1, whereby promoting contraction of the depth-wise dimension of the whole configuration of the optical disc drive apparatus 10.

The practical forms for embodying the present invention have fully been described as above. However, it should be understood that the scope of the present invention is not solely limited to the above cited practical forms, but the present invention may also be modified into a variety of practical forms solely based on the technical thought and the essentials of the present invention.

For example, in the above-described practical forms, the first and second cam surfaces 19 and 20 are formed on the upper surface of the first and second elongated holes 19a and 20a formed on the sliding cam 18. However, it is also allowable to form the first and second cam surfaces 19 and 20 on the bottom surface of the first and second elongated holes 19a and 20a, and then causes one end portions 15b and 16b of a pair of the guide shaft members 15 and 16 to be depressed against the first and second cam surfaces 19 and 20 downward by means of the corresponding pre-pressuring springs 26. Further, by way of forming the first and second cam surfaces 19 and 20 on the gradient upper and bottom surfaces of the first and second elongated holes 19a and 20a aligned in parallel, and then causes one of a pair of the guide rollers having mutually different diameters rotatably secured to one end portions 15b and 16b of a pair of the guide shaft members 15 and 16 to be abutted with the upper-side first and second cam surfaces 19 and 20 and causes the other roller to be abutted with the bottom-side first and second cam surfaces 19 and 20. But, it is also possible to stably lift and lower the one end portions 15b and 16b of the guide shaft members 15 and 16 in the Z direction via the first and second cam surfaces 19 and 20 without utilizing the pre-pressuring springs 26. It is not always necessary to form the first and second cam surfaces 19 and 20 into elongated holes. In addition, it is not always necessary to prepare a pair of guide members by means of the cylindrical guide shaft members, but the running guide members may also comprise a pair of rails. Further, it is not always necessary to shift the sliding cam 18 in the tangential Y direction, but it is also possible to shift the sliding cam 18 in the direction in parallel with a pair of the guide shaft members 15 and 16.

Further, instead of disposing the pivot members 17 on the part of the inner periphery of the optical disc 13, it is possible to dispose the pivot members 17 on the part of outer periphery of the optical disc.

The term "disc" described in this specification does not solely refer to an optical disc, but it also includes such a phase-change type optical recording disc and magneto-optical disc as well. The number of usable object lens may also be a single one.

What is claimed is:

1. An optical disc drive apparatus, comprising:
    an optical pickup unit for emitting optical beams focused by an object lens onto a signal surface of an optical disc that is located on a turntable and rotatably driven; and
    a skew servo mechanism for adjusting an optical axial direction of said optical beams emitted from said optical pickup unit, wherein
    said skew servo mechanism includes:
        a pair of parallel running guide members for guiding said optical pickup unit to run in a radial direction of said optical disc;
        a pair of pivot members secured to a chassis on which a spindle motor having said turntable is mounted for rotatably supporting end portions of said pair of running guide members corresponding to an inner peripheral side of said optical disc by enabling said end portions to slide in a vertical direction perpendicular to said signal surface of said optical disc;
        a sliding cam secured to said chassis for controlling a rotational movement of other end portions of said pair of running guide members corresponding to an outer peripheral side of said optical disc in said vertical direction via a pair of cam surfaces;
        skew detecting means for detecting a skew generated on said signal surface of said optical disc; and
        sliding cam driving means for controlling a sliding movement of said sliding cam based on a result detected by said skew detecting means.

2. The disc drive apparatus according to claim 1, wherein said sliding cam is provided in parallel with said signal surface of said optical disc and slidably secured to said chassis in said vertical direction against said running direction of said optical pickup unit, and said pair of cam surfaces are formed at two ends of said sliding cam.

3. The disc drive apparatus according to claim 1, further comprising:
    a pair of guide members secured to said chassis for guiding said other end portions of said pair of running guide members in said vertical direction.

4. The disc drive apparatus according to claim 1, further comprising:
    a pair of pre-pressuring means secured to said chassis for elastically pressing said other end portions of said pair of running guide members against said pair of cam surfaces.

5. A disc drive apparatus, comprising:
    an optical pickup unit for emitting optical beams focused by an object lens onto a signal surface of an optical disc located on a turntable and rotatably driven; and
    a skew servo mechanism for adjusting an optical axial direction of said optical beams emitted from said optical pickup unit, wherein
    said skew servo mechanism includes:
        a pair of parallel running guide members for guiding said optical pickup unit to run in a radial direction of said optical disc;
        a pair of pivot members secured to a chassis on which a spindle motor having said turntable is mounted for rotatably supporting end portions of said pair of running guide members corresponding to an inner peripheral side of said optical disc by enabling said end portions to slide in a vertical direction perpendicular to said signal surface of said optical disc;
        a sliding cam slidably secured to said chassis for controlling a rotational movement of other end portions of said pair of running guide members corresponding to an outer peripheral side of said optical disc in said vertical direction against said signal surface of said optical disc via a pair of cam surfaces having different skew angles;
        skew detecting means for detecting a skew generated on said signal surface of said optical disc; and
        sliding cam driving means for controlling a sliding movement of said sliding cam based on a result detected by said skew detecting means.

6. The disc drive apparatus according to claim 5, wherein said sliding cam is provided in parallel with said signal surface of said optical disc and slidably secured to said chassis in said vertical direction against said running direction of said optical pickup unit; and
    said pair of cam surfaces having different skew angles are formed at two ends of said sliding cam.

7. The disc drive apparatus according to claim 5, further comprising:
    a pair of guide members secured to said chassis for guiding said other end portions of said pair of running guide members in said vertical direction.

8. The disc drive apparatus according to claim 5, further comprising:
    a pair of pre-pressuring means secured to said chassis for elastically pressing said other end portions of said pair of running guide members against said pair of cam surfaces.

9. A disc drive apparatus comprising:
    an optical pickup unit for emitting optical beams focused by an object lens onto a signal surface of an optical disc located on a turntable and rotatably driven; and
    a skew servo mechanism for adjusting an optical axial direction of said optical beams emitted from said optical pickup unit, wherein said skew servo mechanism includes:
- a pair of parallel running guide members for guiding said optical pickup unit by running said optical pickup unit in a radial direction of said optical disc;
- a pair of pivot members secured to a chassis on which a spindle motor having said turntable is mounted for rotatably supporting end portions of said pair of running guide members corresponding to an inner peripheral side of said optical disc by enabling said end portions to slide in a vertical direction perpendicular to said signal surface of said optical disc;
- a pair of independent sliding cams independently secured to said chassis for controlling rotational movement of other portions of said pair of running guide members corresponding to an outer peripheral side of said optical disc in said vertical direction via a pair of cam surfaces;
- skew detecting means for detecting a skew generated on said signal surface of said optical disc; and
- sliding cam driving means for controlling a sliding movement of said sliding cams based on a result detected by said skew detecting means.

10. The disc drive apparatus according to claim 9, further comprising:
- a pair of guide members secured to said chassis for guiding said other end portions of said pair of running guide members in said vertical direction.

11. The disc drive apparatus according to claim 9, further comprising:
- a pair of pre-pressuring means secured to said chassis for elastically pressing said other end portions of said pair of running guide members against said pair of cam surfaces.

12. A disc drive apparatus, comprising:
- an optical pickup unit for emitting optical beams focused by an object lens onto a signal surface of an optical disc located on a turntable and rotatably driven; and
- a skew servo mechanism for adjusting an optical axial direction of said optical beams emitted from said optical pickup unit, wherein
- said skew servo mechanism comprises:
  - a pair of parallel running guide members for guiding said optical pickup unit by running said optical pickup unit in a radial direction of said optical disc;
  - a pair of pivot members secured to a chassis on which a spindle motor having said turntable is mounted for supporting end portions of said pair of running guide members corresponding to an inner peripheral side of said optical disc slidably held in a vertical direction perpendicular to said signal surface of said optical disc and for supporting said running guide members at different positions in parallel with said running direction of said optical pickup unit;
  - a sliding cam secured to said chassis for controlling a rotational movement of other end portions of said pair of running guide members corresponding to an outer peripheral side of said optical disc in said vertical direction via a pair of cam surfaces;
  - skew detecting means for detecting a skew generated on said signal surface of said optical disc; and
  - sliding cam driving means for controlling a sliding movement of said sliding cam based on a result detected by said skew detecting means.

13. The disc drive apparatus according to claim 12, wherein
said sliding cam is secured to said chassis in parallel with said signal surface of said optical disc and slidably attached to said chassis in said vertical direction against said running direction of said optical pickup unit, wherein
said pair of cam surfaces are formed at two ends of said sliding cam.

14. The disc drive apparatus according to claim 12, further comprising:
- a pair of guide members secured to said chassis for guiding said other end portions of said pair of running guide members in said vertical direction.

15. The disc drive apparatus according to claim 12, further comprising:
- a pair of pre-pressuring means secured to said chassis for elastically pressing said other end portions of said pair of running guide members against said pair of cam surfaces.

16. A disc drive apparatus, comprising:
- an optical pickup unit for emitting optical beams focused by an object lens onto a signal surface of an optical disc located on a turntable and rotatably driven; and
- a skew servo mechanism for adjusting an optical axial direction of said optical beams emitted from said optical pickup unit, wherein
- said skew servo mechanism includes:
  - a pair of parallel running guide members for guiding said optical pickup unit to run in a radial direction of said optical disc;
  - a pair of pivot members secured to a chassis on which a spindle motor having said turntable is mounted for rotatably supporting end portions of said pair of running guide members corresponding to an inner peripheral side of said optical disc by enabling said end portions to be slidably shifted in a vertical direction perpendicular to said signal surface of said optical disc;
  - a sliding cam slidably secured to said chassis for controlling a rotational movement of other end portions of said pair of guide members corresponding to an outer peripheral side of said optical disc in said vertical direction;
  - skew detecting means for detecting a skew generated on said signal surface of said optical disc; and
  - sliding cam driving means for controlling a sliding movement of said sliding cam based on a result detected by said skew detecting means,
  - said sliding cam driving means having a stepping motor and a lead screw that is slidably driven by said stepping motor to control said sliding movement of said sliding cam at a predetermined pitch.

17. The disc drive apparatus according to claim 16, wherein
said sliding cam is provided in parallel with said signal surface of said optical disc and slidably attached to said chassis in said vertical direction against said running direction of said optical pickup unit; and
said pair of cam surfaces are formed at two ends of said sliding cam.

18. The disc drive apparatus according to claim 16, further comprising:
- a pair of guide members secured to said chassis for guiding said other end portions of said pair of running guide members in said vertical direction.

19. The disc drive apparatus according to claim 16, further comprising:
- a pair of pre-pressuring means secured to said chassis for elastically pressing said other end portions of said pair of running guide members against said pair of cam surfaces.

20. The disc drive apparatus according to claim 16, wherein a coupling member coupled with helical grooves of said lead screw is integrally formed with said sliding cams.

21. The disc drive apparatus according to claim 20, further comprising pre-pressuring means for causing said coupling member to be elastically pressed against said helical grooves for engagement with said helical grooves.

* * * * *